US012215001B2

(12) United States Patent
Ishikawa et al.

(10) Patent No.: US 12,215,001 B2
(45) Date of Patent: Feb. 4, 2025

(54) GUIDE DISPLAY DEVICE AND CRANE EQUIPPED WITH SAME

(71) Applicants: TADANO LTD., Kagawa (JP); THE SCHOOL CORPORATION KANSAI UNIVERSITY, Osaka (JP)

(72) Inventors: Iwao Ishikawa, Kagawa (JP); Takayuki Kosaka, Kagawa (JP); Keita Mashima, Kagawa (JP); Satoshi Kubota, Osaka (JP); Shigenori Tanaka, Osaka (JP); Masaya Nakahara, Osaka (JP); Koki Nakahata, Osaka (JP)

(73) Assignees: TADANO LTD., Kagawa (JP); THE SCHOOL CORPORATION KANSAI UNIVERSITY, Osaka (JP)

( * ) Notice: Subject to any disclaimer, the term of this patent is extended or adjusted under 35 U.S.C. 154(b) by 288 days.

(21) Appl. No.: 17/911,049

(22) PCT Filed: Mar. 23, 2021

(86) PCT No.: PCT/JP2021/012004
§ 371 (c)(1),
(2) Date: Sep. 12, 2022

(87) PCT Pub. No.: WO2021/193639
PCT Pub. Date: Sep. 30, 2021

(65) Prior Publication Data
US 2023/0106308 A1    Apr. 6, 2023

(30) Foreign Application Priority Data
Mar. 26, 2020   (JP) .................... 2020-056811

(51) Int. Cl.
G06T 15/00    (2011.01)
B66C 13/46    (2006.01)
G01S 17/89    (2020.01)

(52) U.S. Cl.
CPC .............. B66C 13/46 (2013.01); G01S 17/89 (2013.01)

(58) Field of Classification Search
CPC ...... B66C 13/46; B66C 15/065; G06V 20/64; G06V 20/58; G06V 10/25; G06V 20/70; G06V 10/762; G01S 7/4808; G01S 17/89
(Continued)

(56) References Cited

U.S. PATENT DOCUMENTS 9,014,848 B2 *  4/2015  Farlow ................ B25J 19/023
                                                         701/25
9,498,886 B2 * 11/2016  Rosenstein .......... G05D 1/0251
(Continued)

FOREIGN PATENT DOCUMENTS

JP    2019-024151 A    2/2019

OTHER PUBLICATIONS

Loupos K, Doulamis AD, Stentoumis C, Protopapadakis E, Makantasis K, Doulamis ND, Amditis A, Chrobocinski P, Victores J, Montero R, Menendez E. Autonomous robotic system for tunnel structural inspection and assessment. International Journal of Intelligent Robotics and Applications. Mar. 2018;2:43-66.*
(Continued)

Primary Examiner — Phu K Nguyen
(74) Attorney, Agent, or Firm — Paratus Law Group, PLLC

(57) ABSTRACT

The present invention provides a guide display device capable of recognizing a feature in a work area while distinguishing whether the feature is a moving body or not. In a guide display device of a crane, 3D maps are created for
(Continued)

continuous frames; an altitude value for each grid in a 3D map that is created at time closest to the current time is obtained as a first altitude value; altitude values for respective corresponding grids in a predetermined number of 3D maps other than the 3D map that is created at time closest to the current time are obtained, and the average of the altitude values is calculated as a second altitude value; and it is determined that the feature is a moving body when the difference between the first altitude value and the second altitude value exceeds a predetermined threshold.

5 Claims, 18 Drawing Sheets

(58) Field of Classification Search
USPC .......................................................... 345/418
See application file for complete search history.

(56) References Cited

U.S. PATENT DOCUMENTS

| | | | |
|---|---|---|---|
| 11,084,692 B2 | 8/2021 | Kosaka et al. | |
| 11,907,423 B2* | 2/2024 | Muhammad | G06V 20/20 |
| 12,032,657 B2* | 7/2024 | Ishikawa | G01C 7/02 |
| 12,110,213 B2* | 10/2024 | Ishikawa | G06T 17/05 |
| 2018/0080882 A1* | 3/2018 | Boyer | B25J 18/025 |
| 2018/0306589 A1* | 10/2018 | Holz | G01C 21/28 |
| 2019/0196480 A1* | 6/2019 | Taylor | G05D 1/0223 |
| 2019/0196488 A1* | 6/2019 | Holmberg | G05D 1/0225 |
| 2022/0197306 A1* | 6/2022 | Cella | G06N 3/088 |
| 2023/0123322 A1* | 4/2023 | Cella | G06Q 30/0202 |
| | | | 700/29 |
| 2023/0222454 A1* | 7/2023 | Cella | G06N 7/01 |
| | | | 705/28 |

OTHER PUBLICATIONS

Liski, T., 2014. 3-D collision checking for improving machine operator's spatial awareness (Master's thesis).*

Marshall, J.A., Bonchis, A., Nebot, E. and Scheding, S., 2016. Robotics in mining. Springer handbook of robotics, pp. 1549-1576.*

Jun. 15, 2021, International Search Report issued for related PCT Application No. PCT/JP2021/012004.

Jun. 15, 2021, International Search Opinion issued for related PCT Application No. PCT/JP2021/012004.

* cited by examiner

| GRID COORDINATES | FIRST LABEL VALUE Ln1 |
|---|---|
| (6,4) | 0 |
| (6,5) | 0 |
| (6,6) | 1 |
| (6,7) | 1 |
| (6,8) | 0 |
| (6,9) | 1 |
| (6,10) | 0 |

| GRID COORDINATES | SECOND LABEL VALUE Ln2 |
|---|---|
| (6,4) | 0 |
| (6,5) | 0 |
| (6,6) | 1 |
| (6,7) | 1 |
| (6,8) | 0 |
| (6,9) | 0 |
| (6,10) | 0.5 |

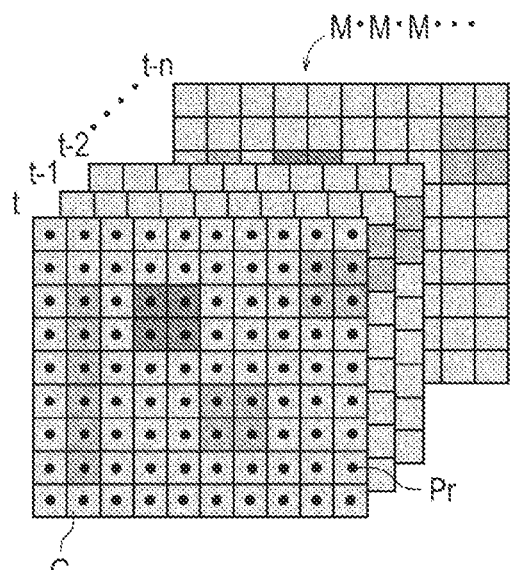
FIG. 16A
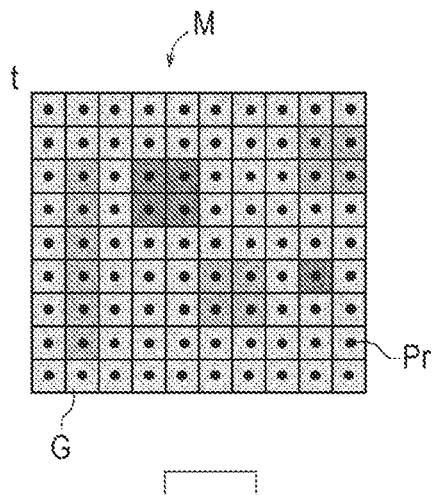
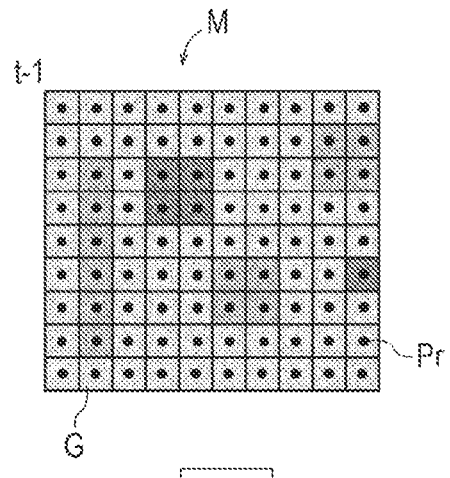
FIG. 16B
FIG. 16C

GUIDE DISPLAY DEVICE AND CRANE EQUIPPED WITH SAME

CROSS REFERENCE TO PRIOR APPLICATION

This application is a National Stage Patent Application of PCT International Patent Application No. PCT/JP2021/012004 (filed on Mar. 23, 2021) under 35 U.S.C. § 371, which claims priority to Japanese Patent Application No. 2020-056811 (filed on Mar. 26, 2020), which are all hereby incorporated by reference in their entirety.

TECHNICAL FIELD

The present invention relates to a guide display device and a crane including the same.

BACKGROUND ART

In the related art, a guide display device that can present information related to positions and altitudes of a lifting cargo and a ground object around the lifting cargo to the operator is publicly known. Such a guide display device is disclosed in PTL 1.

The guide display device disclosed in PTL 1 includes a data processing section that calculates a representative point for each grid cell by using point group data acquired by a laser scanner and creates a three-dimensional map based on the representative point. The data processing section generates a guide information such as a guide frame diagram surrounding the lifting cargo and the ground object, and displays the guide information in a superimposed manner on the image captured by the camera on a data display section. With such a guide display device, the information related to positions and altitudes of the lifting cargo and the ground object around the lifting cargo can be presented to the operator.

CITATION LIST

Patent Literature

PTL 1
Japanese Patent Application Laid-Open No. 2019-24151

SUMMARY OF INVENTION

Technical Problem

However, the guide display device disclosed in PTL 1 can recognize the ground object in the work area, but it cannot recognize whether that ground object is a moving object in a discriminative manner. Specifically, as illustrated in FIG. 18, it can recognize the ground object in the work area, but it cannot recognize whether that the ground object is a moving object such as a worker and a working vehicle in a discriminative manner.

To solve the above-described problems, an object of the present invention is to provide a guide display device that can recognize whether the ground object in the work area is a moving object in a discriminative manner. In addition, another object is to provide a crane including such a guide display device.

Solution to Problem

The problems to be solved by the present invention are as described above, and a solution to the problems is described below.

The first invention is a guide display device of a crane, including: a data processing section configured to calculate a representative point for each grid cell by using point group data acquired with a laser scanner by scanning a lifting cargo, a ground surface and a ground object from above the lifting cargo and create a three-dimensional map based on the representative point. The data processing section creates the three-dimensional map in a unit of successive frames. The data processing section acquires an altitude value of each grid cell as a first altitude value for the three-dimensional map created at a time closest to a current time. The data processing section acquires an altitude value of each grid cell for a predetermined number of other three-dimensional maps excluding the three-dimensional map created at the time closest to the current time, and calculates an average of the altitude value as a second altitude value. The data processing section determines that the ground object is a moving object when a difference between the first altitude value and the second altitude value exceeds a predetermined threshold value.

The second invention is a guide display device of a crane, including: a data processing section configured to calculate a representative point for each grid cell by using point group data acquired with a laser scanner by scanning a lifting cargo, a ground surface and a ground object from above the lifting cargo and create a three-dimensional map based on the representative point. The data processing section creates the three-dimensional map in a unit of successive frames. The data processing section acquires an altitude value of each grid cell for a predetermined number of the three-dimensional maps including the three-dimensional map created at a time closest to a current time, and calculates an average of the altitude value as a first average value. The data processing section acquires an altitude value of each grid cell for a predetermined number of other three-dimensional maps excluding the three-dimensional map created at the time closest to the current time, and calculates an average of the altitude value as a second average value. The data processing section determines that the ground object is a moving object when a difference between the first average value and the second average value exceeds a predetermined threshold value.

The third invention is a guide display device of a crane, including: a data processing section configured to calculate a representative point for each grid cell by using point group data acquired with a laser scanner by scanning a lifting cargo, a ground surface and a ground object from above the lifting cargo and create a three-dimensional map based on the representative point. The data processing section creates the three-dimensional map in a unit of successive frames. The data processing section provides a label value representing the ground surface or the ground object for each grid cell for each three-dimensional map. The data processing section acquires the label value of each grid cell as a first label value for the three-dimensional map created at a time closest to a current time. The data processing section acquires the label value of each grid cell for a predetermined number of other three-dimensional maps excluding the three-dimensional map created at the time closest to the current time, and calculates an average of the label value as a second label value. The data processing section determines that the ground object is a moving object when a difference between the first label value and the second label value exceeds a predetermined threshold value.

The fourth invention is a guide display device of a crane, including: a data processing section configured to calculate a representative point for each grid cell by using point group data acquired with a laser scanner by scanning a lifting cargo, a ground surface and a ground object from above the lifting cargo and create a three-dimensional map based on the representative point. The data processing section creates the three-dimensional map in a unit of successive frames. The data processing section specifies the ground object for each three-dimensional map. The data processing section acquires, as a first ground object position, a position of the ground object in the three-dimensional map created at a time closest to a current time. The data processing section acquires, as a second ground object position, the position of the ground object in another three-dimensional map excluding the three-dimensional map created at a time closest to a current time. The data processing section determines that the ground object is a moving object when a difference between the first ground object position and the second ground object position exceeds a predetermined threshold value.

The fifth invention is a crane comprising the above-described guide display device.

Advantageous Effects of Invention

Effects of the present invention are as described below.

The guide display device according to the first invention creates a three-dimensional map in a unit of successive frames. In addition, it acquires an altitude value of each grid cell as a first altitude value for the three-dimensional map created at a time closest to a current time, acquires an altitude value of each grid cell for a predetermined number of other three-dimensional maps excluding the three-dimensional map created at the time closest to the current time, calculates an average of the altitude value as a second altitude value, and determines that the ground object is a moving object when a difference between the first altitude value and the second altitude value exceeds a predetermined threshold value. With this guide display device, whether the ground object in the work area is a moving object can be recognized in a discriminative manner.

The guide display device according to the second invention creates a three-dimensional map in a unit of successive frames. In addition, it acquires an altitude value of each grid cell for a predetermined number of the three-dimensional maps including the three-dimensional map created at a time closest to a current time, and calculates an average of the altitude value as a first average value, acquires an altitude value of each grid cell for a predetermined number of other three-dimensional maps excluding the three-dimensional map created at the time closest to the current time, calculates an average of the altitude value as a second average value, and determines that the ground object is a moving object when a difference between the first average value and the second average value exceeds a predetermined threshold value. With this guide display device, whether the ground object in the work area is a moving object can be recognized in a discriminative manner.

The guide display device according to the third invention creates a three-dimensional map in a unit of successive frames. In addition, it provides a label value representing the ground surface or the ground object for each grid cell for each three-dimensional map, acquires the label value of each grid cell as a first label value for the three-dimensional map created at a time closest to a current time, acquires the label value of each grid cell for a predetermined number of other three-dimensional maps excluding the three-dimensional map created at the time closest to the current time, calculates an average of the label value as a second label value, and determines that the ground object is a moving object when a difference between the first label value and the second label value exceeds a predetermined threshold value. With this guide display device, whether the ground object in the work area is a moving object can be recognized in a discriminative manner.

The guide display device according to the fourth invention creates a three-dimensional map in a unit of successive frames. In addition, it specifies the ground object for each three-dimensional map, acquires, as a first ground object position, a position of the ground object in the three-dimensional map created at a time closest to a current time, acquires, as a second ground object position, the position of the ground object in another three-dimensional map excluding the three-dimensional map created at a time closest to a current time, and determines that the ground object is a moving object when a difference between the first ground object position and the second ground object position exceeds a predetermined threshold value. With this guide display device, whether the ground object in the work area is a moving object can be recognized in a discriminative manner.

The crane according to the fifth invention includes the guide display device according to the first to fourth inventions. With such a crane, an effect similar to the above-described effect can be achieved.

BRIEF DESCRIPTION OF DRAWINGS

FIG. 16 is a diagram illustrating an overview of the same region estimation process according to the fourth embodiment;

DESCRIPTION OF EMBODIMENTS

First, a crane according to an embodiment of the present invention 1 is described.

Figure 1:
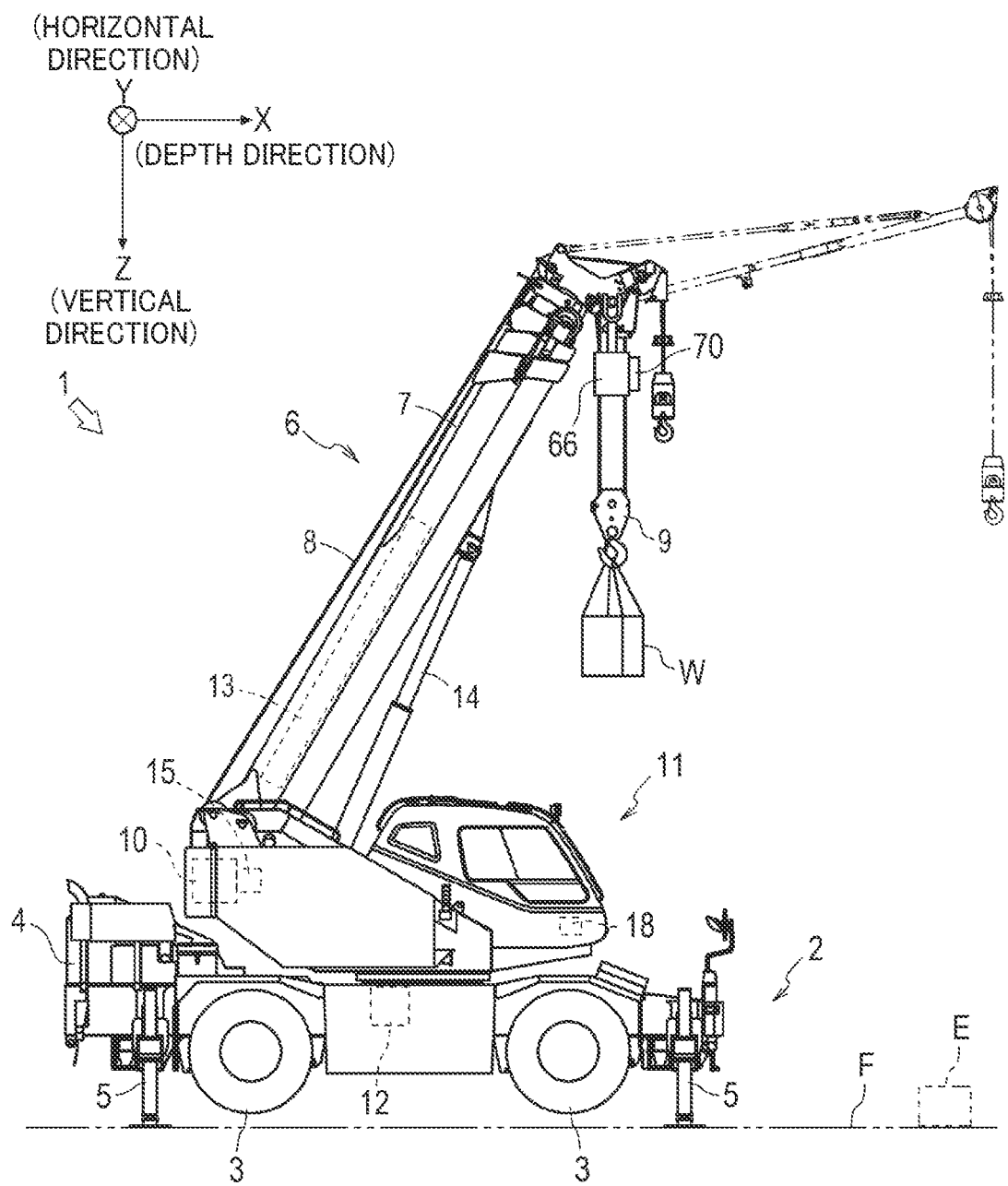
FIG. 1 is a diagram illustrating a crane according to an embodiment of the present invention.

As illustrated in FIG. 1, crane 1 is a mobile crane that can move to an unspecified location.

Crane 1 includes traveling vehicle 2 and crane apparatus 6.

Traveling vehicle 2 transports crane apparatus 6. Traveling vehicle 2 includes a plurality of wheels 3, and travels with engine 4 as the power source. Traveling vehicle 2 is provided with outrigger 5. Outrigger 5 is composed of a beam that extends in the width direction of traveling vehicle 2 and a jack cylinder that is grounded on ground surface F to support traveling vehicle 2.

Crane apparatus 6 transports lifting cargo W in a lifted state. Crane apparatus 6 includes boom 7. Wire rope 8 is provided across boom 7. Hook 9 is attached at wire rope 8 that hangs from the end portion of boom 7. In addition, winch 10 is disposed near the proximal end side of boom 7. Note that crane apparatus 6 includes cabin 11 on the lateral side of boom 7. Swinging operation tool 19, expanding/retracting operation tool 20, luffing operation tool 21, winding operation tool 22 and the like are provided inside cabin 11 (see FIG. 2).

Boom 7 is swivelable by an actuator. In the subject application, this actuator is defined as swinging motor 12. Swinging motor 12 is appropriately operated by swinging valve 23, which is an electromagnetic proportional switching valve (see FIG. 2). Specifically, swinging motor 12 appropriately operates when swinging valve 23 switches the flow rate and flow direction of the operation oil. Note that swinging valve 23 operates based on an instruction of control apparatus 18. The swinging angle of boom 7 is detected by swinging sensor 27 (see FIG. 2).

In addition, boom 7 can be extended and retracted by an actuator. In the subject application, this actuator is defined as extending/retracting cylinder 13. Extending/retracting cylinder 13 is appropriately operated by extending/retracting valve 24, which is an electromagnetic proportional switching valve (see FIG. 2). Specifically, extending/retracting cylinder 13 appropriately operates when extending/retracting valve 24 switches the flow rate and flow direction of the operation oil. Note that extending/retracting valve 24 operates based on an instruction of control apparatus 18. The expansion/retraction length of boom 7 is detected by extending/retracting sensor 28 (see FIG. 2).

Further, boom 7 can be freely raised and lowered by an actuator. In the subject application, this actuator is defined as luffing cylinder 14. Luffing cylinder 14 is appropriately operated by luffing valve 25, which is an electromagnetic proportional switching valve (see FIG. 2). Specifically, luffing cylinder 14 appropriately operates when lulling valve 25 switches the flow rate and flow direction of the operation oil. Note that luffing valve 25 operates based on an instruction of control apparatus 18. The luffing angle of boom 7 is detected by luffing sensor 29 (see FIG. 2).

Additionally, hook 9 can be rifted and lowered by the actuator. In the subject application, this actuator is defined as winding motor 15. Winding motor 15 is appropriately operated by winding valve 26, which is an electromagnetic proportional switching valve (see FIG. 2). Specifically, winding motor 15 appropriately operates when winding valve 26 switches the flow rate and flow direction of the operation oil. Note that winding valve 26 operates based on an instruction of control apparatus 18. The hanging length of hook 9 is detected by winding sensor 30 (see FIG. 2).

Incidentally, in the subject application, the XYZ coordinate system is defined with respect to crane 1. The X-axis direction (also referred to as depth direction) in the XYZ coordinate system is a direction perpendicular to the axis direction of the luffing fulcrum of boom 7 and perpendicular to the gravity direction. In addition, the Y-axis direction (also referred to as horizontal direction) in the XYZ coordinate system is a direction parallel to the axis direction of the lulling fulcrum of boom 7 and perpendicular to the gravity direction. Further, the Z-axis direction (also referred to as vertical direction) in the XYZ coordinate system is a direction perpendicular to the axis direction of the tufting fulcrum of boom 7 and parallel to the gravity direction.

Next, guide display device (guide display system) 50 according to an embodiment of the present invention is described.

Figure 2:
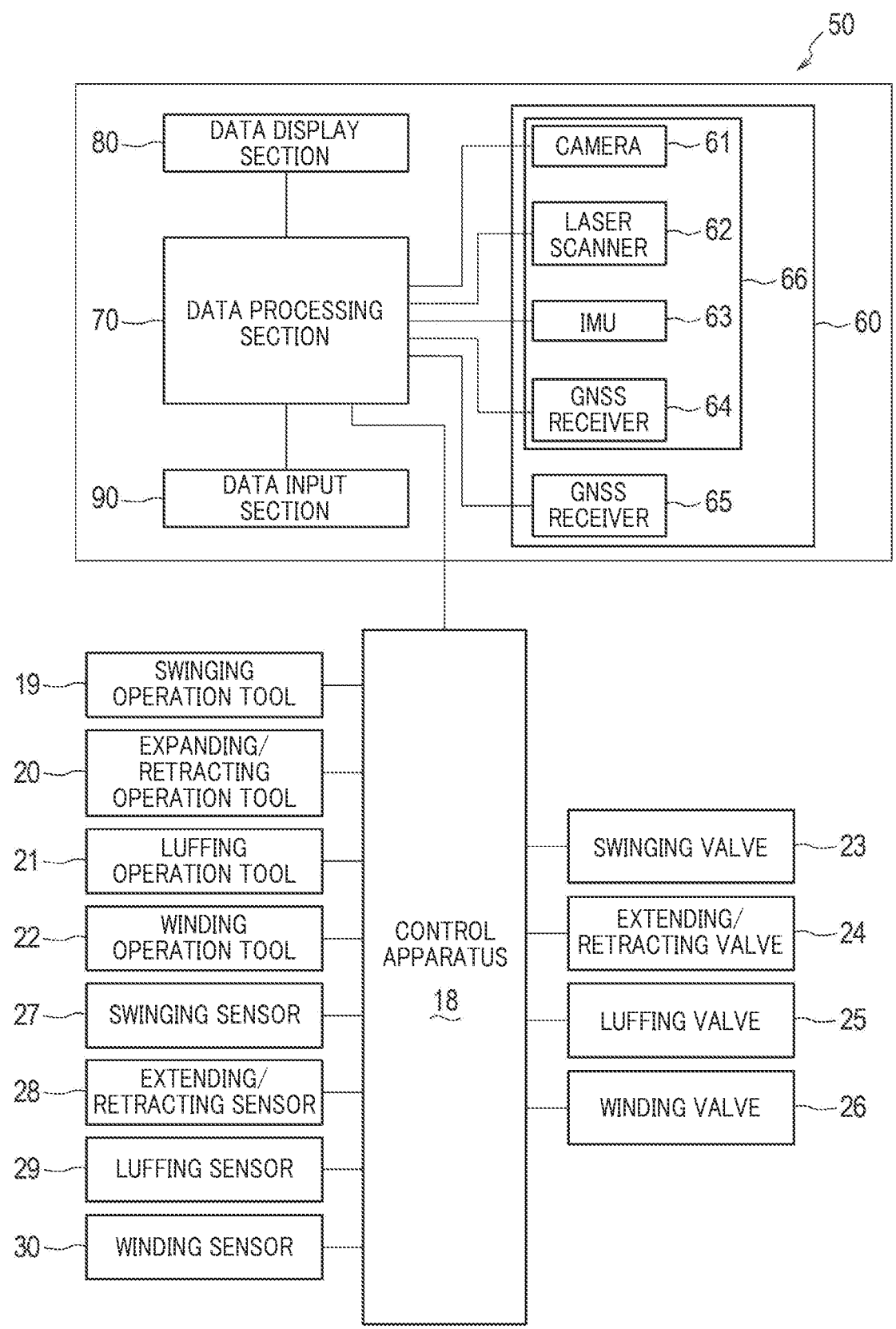
FIG. 2 is a diagram illustrating a guide display device according to an embodiment of the present invention.

As illustrated in FIG. 2, guide display device 50 is linked to control apparatus 18 of crane 1. Guide display device 50 includes data acquiring section 60, data processing section 70, data display section 80 and data input section 90.

Data acquiring section 60 acquires information required for generating guide information described later. Data acquiring section 60 includes sensor unit 66 composed of camera 61, laser scanner 62, inertia measurement unit 63 and first positioning apparatus 64 integrated with each other. Sensor unit 66 is attached at the end portion of boom 7 through a gimbal (see FIG. 1).

Camera 61 captures a part of the work area. Camera 61 outputs a captured image to data processing section 70. Note that camera 61 captures lifting cargo W and ground surface F (including ground object E) around lifting cargo W from above lifting cargo W. Thus, data processing section 70 can acquire the images of lifting cargo W and ground surface F (including ground object F) around lifting cargo W.

Figure 3A:
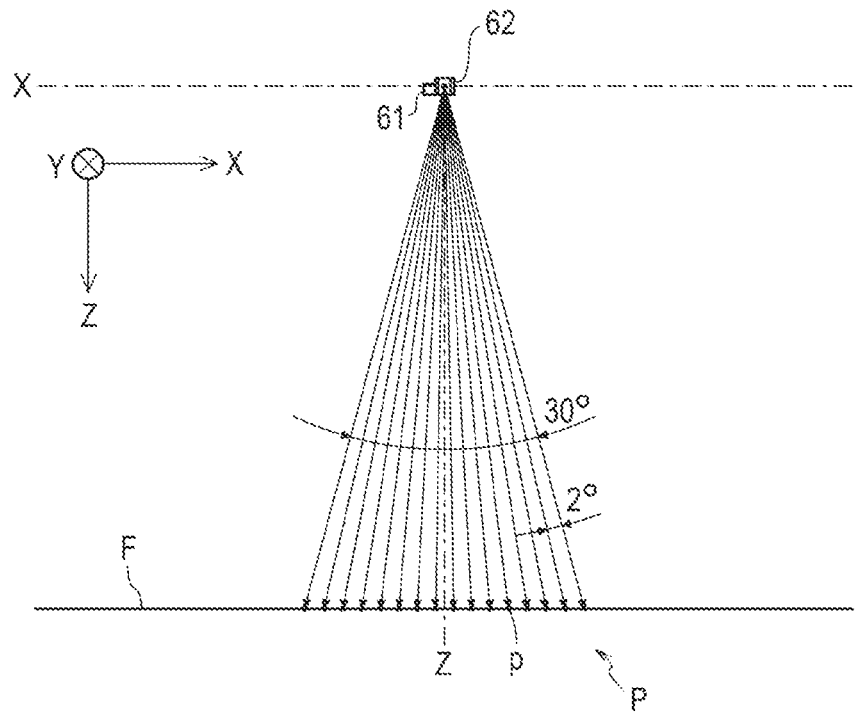
FIG. 3 is a diagram illustrating scanning with a laser scanner.
Figure 3B:
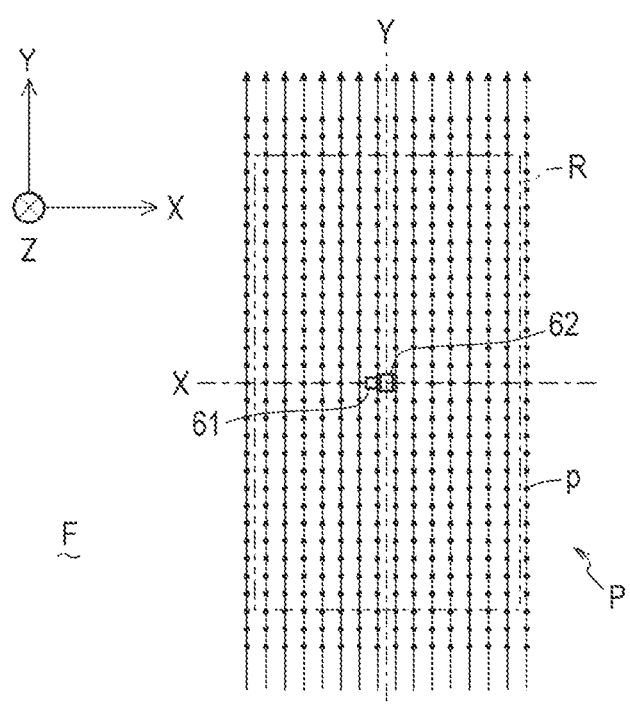

Laser scanner 62 acquires point group data P for a part of the work area (see FIG. 3). Laser scanner 62 outputs the acquired point group data P to data processing section 70. Note that laser scanner 62 scans lifting cargo W and ground surface F (including ground object E) around lifting cargo W from above lifting cargo W. Thus, data processing section 70 can acquire point group data P of lifting cargo W and ground surface F (including ground object E) around lifting cargo W.

Inertia measurement unit (hereinafter referred to as "IMU") 63 acquires information related to the posture of sensor unit 66 (more specifically, information related to the postures of camera 61 and laser scanner 62). IMU 63 outputs the acquired information related to the postures of camera 61 and laser scanner 62 to data processing section 70. Thus, data processing section 70 can acquire the information related to the postures of camera 61 and laser scanner 62.

First positioning apparatus (Global Navigation Satellite System, hereinafter referred to as "GNSS receiver") 64 acquires the latitude, the longitude and the altitude value (more specifically, the coordinate value of laser scanner 62) of sensor unit 66 by receiving radio waves emitted from the GNSS satellite. GNSS receiver 64 outputs the acquired coordinate value of laser scanner 62 to data processing section 70. Thus, data processing section 70 can acquire the coordinate value of laser scanner 62.

Additionally, in data acquiring section 60, second positioning apparatus 65 is disposed at the swinging center position of crane apparatus 6. Second positioning apparatus (Global Navigation Satellite System, hereinafter referred to as "GNSS receiver") 65 acquires the latitude, the longitude and the altitude value (more specifically, the coordinate value of the swinging center of crane apparatus 6) of the swinging center of crane apparatus 6 by receiving radio waves emitted from the GNSS satellite. GNSS receiver 65 outputs the acquired swinging center coordinate value to data processing section 70. Thus, data processing section 70 can acquire the coordinate value of the swinging center of crane apparatus 6.

In this manner, with the coordinate value of laser scanner 62 and the coordinate value of the swinging center of crane apparatus 6, guide display device 50 makes up a GNSS compass with boom 7 as the bassline. Thus, data processing section 70 can calculate the orientation of laser scanner 62. In addition, in guide display device 50, it is preferable that the measurement time of IMU 63 and point group data P be synchronized at the time of the atomic clock of the GNSS satellite (hereinafter referred to as "GNSS time"). Note that GNSS receiver 64 and GNSS receiver 65, with high measurement accuracy real time kinematic (RTK) positioning system employ. It should be noted that the RTK positioning system is not limitative, and other positioning systems may be employed.

Data processing section 70 is connected to data acquiring section 60, and performs various processes. Data processing section 70 is composed of a general-purpose computer, for example. Note that data processing section 70 is disposed near sensor unit 66, it should be noted that data processing section 70 may be disposed at other locations such as inside cabin 11. Naturally, it may be portable.

Data display section 80 is connected to data processing section 70, and displays various information. Data display section 80 is composed of a general-purpose monitor, for example. Note that data display section 80 is disposed inside cabin 11. Thus, the information can be provided to the operator of crane 1. Naturally, in the case where data processing section 70 is portable or the like, it may be an integrated monitor.

Data input section 90 is connected to data processing section 70, and configured to input various numerical values or change the setting. Data input section 90 is composed of a general-purpose keyboard, mouse, or touch panel. Note that data input section 90 is also disposed inside cabin 11. Thus, the operator of crane 1 can freely input numerical values or change the setting. Naturally, in the case where data processing section 70 is portable or the like, it may be an integrated keyboard, mouse, or touch panel.

Next, scanning with laser scanner 62 is described.

As illustrated in FIG. 3, laser scanner 62 irradiates ground surface F with laser light from above. Laser scanner 62 includes a plurality of laser transmitters and laser receivers, and can simultaneously emit a plurality of laser beams and simultaneously acquire a plurality of pieces of point data p (a set of point data p is point group data P).

To be more specific, laser scanner 62 includes a total of 16 laser transmitters, and can simultaneously emit 16 laser beams. The irradiation angles of the laser transmitters are different from each other by 2 degrees around in the Y-axis direction. In addition, the laser transmitters are configured to be able to perform the emission while continuously changing the phase angle around the X axis. Thus, laser scanner 62 can irradiate a predetermined range of ground surface F with laser light.

Further, laser scanner 62 includes a total of 16 laser receivers, and can simultaneously detect reflection light of 16 laser beams. The irradiation angles of the laser receivers are different from each other by 2 degrees around the Y-axis direction. In addition, each laser receiver is configured to be able to detect the reflection light at the same light path as that of the laser light transmitted from the laser transmitter. In this manner, laser scanner 62 can acquire point group data P covering ground surface F. Note that the range where point group data P can be acquired includes measurement region R, which is the range captured by camera 61.

With this configuration, data processing section 70 can acquire point group data P for the range including measurement region R. Laser scanner 62 scans lifting cargo W and ground surface F (including around object E) around lifting cargo W from above lifting cargo W, and thus point group data P indicates lifting cargo W, ground surface F, and ground object E. Various information acquired by IMU 63 and GNSS receivers 64 and 65 is added to each point data p making up point group data P. Examples of such information include posture information and location information.

Next, a procedure of a process of data processing section 70 is described.

Figure 4:
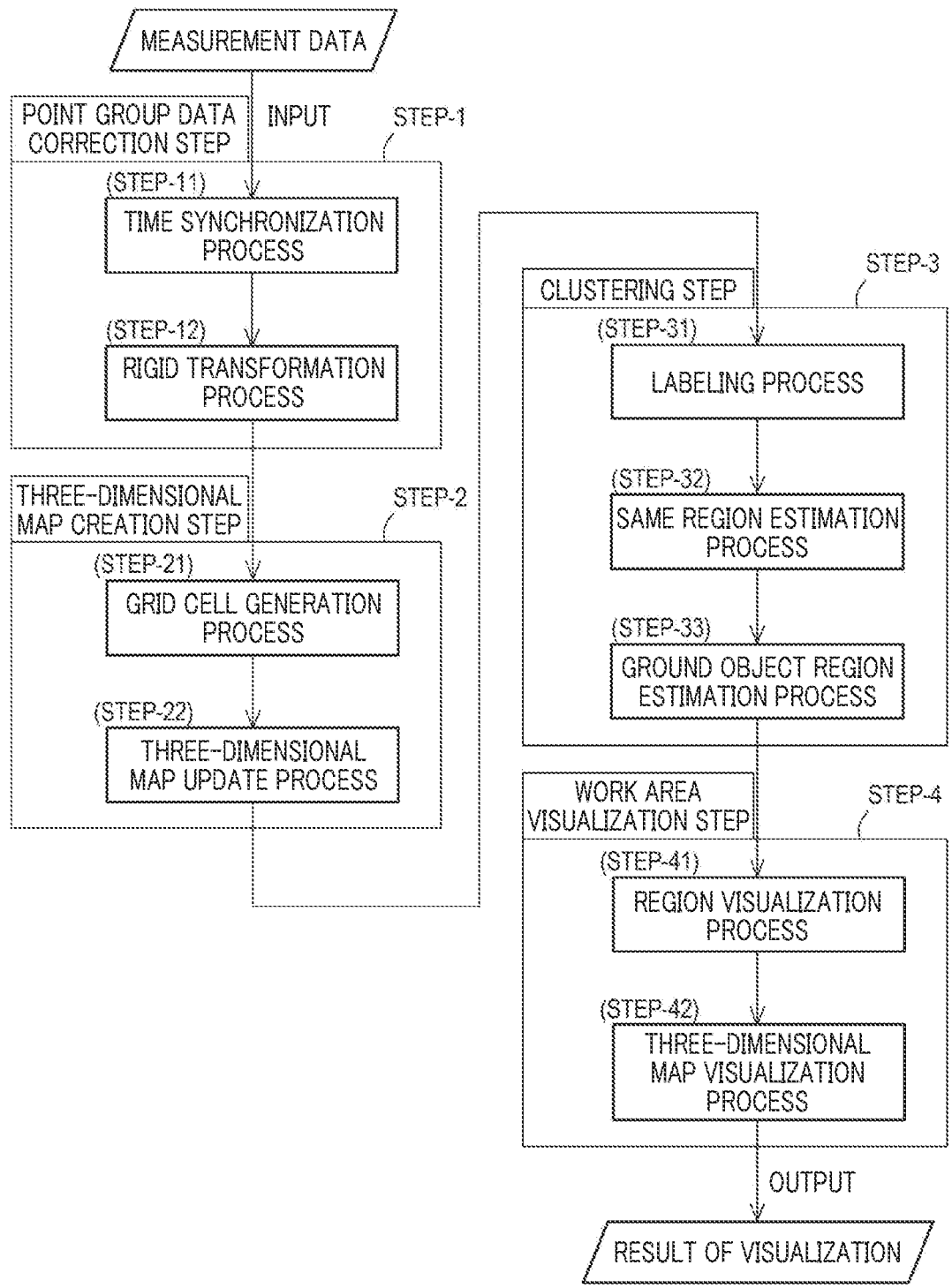
FIG. 4 is a flow chart illustrating a procedure of a process of a data processing section.

As illustrated in FIG. 4, data processing section 70 performs point group data correction step STEP-1, three-dimensional map creation step STEP-2, clustering step STEP-3 and work area visualization step STEP-4. These steps are repeated at predetermined time intervals.

Figure 5:
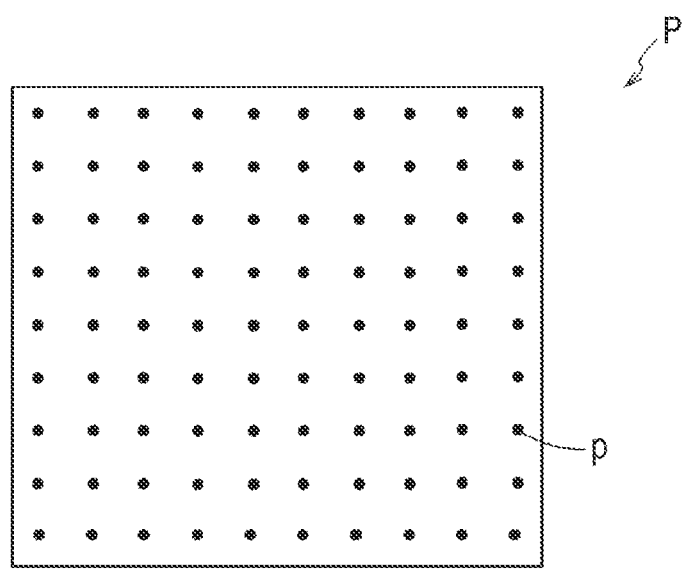
FIG. 5 is a diagram illustrating an overview of a point group data correction step.

At point group data correction step STEP-1, the point group data P, posture information and location information of the time point closest to the current time are acquired on the basis of the information of laser scanner 62, IMU 63 and GNSSs 64 and 65, and the orientation of laser scanner 62 is calculated. Then, by using the posture information, location information and orientation, the position and inclination of point group data P are corrected, and are output as corrected point group data P (see FIG. 5).

To be more specific, point group data correction step STEP-1 is composed of time synchronization process STEP-11 and rigid transformation process STEP-12.

At time synchronization process STEP-11, at the time closest to the current time, the information of IMU 63, GNSSs 64 and 65 and laser scanner 62 that has run from one end to the other in measurement region R are synchronized at the GNSS time. Then, the combination of the synchronized point data p, posture information, and location information are output.

At rigid transformation process STEP-12, one combination of the synchronized point data p, posture information, and location information is acquired. Then, rigid transformation of the coordinate value of point data p is performed by using the acquired posture information, the coordinate system of point data p is converted into a plane right angle coordinate system, and point group data P with the corrected inclination, position and orientation is output.

Figure 6A:
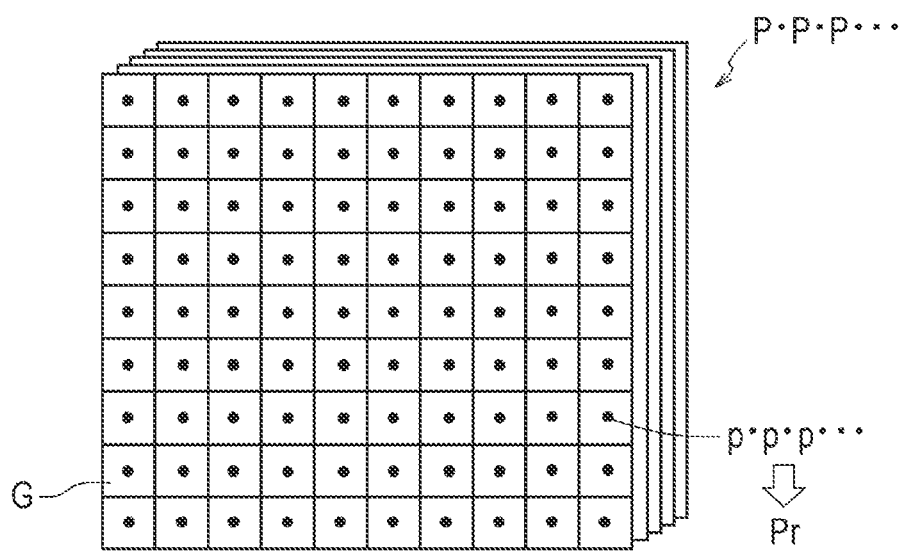
FIG. 6 is a diagram illustrating an overview of a three-dimensional map creation step.
Figure 6B:
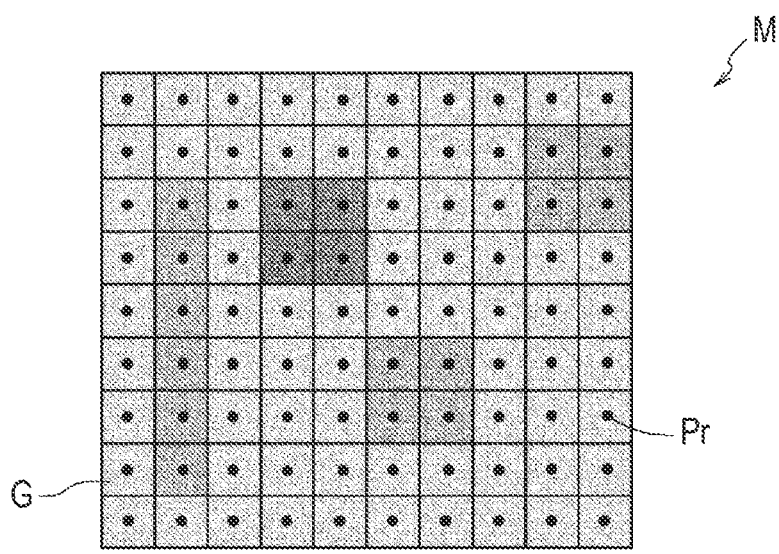

At three-dimensional map creation step STEP-2, corrected point group data P acquired at different times and positions are superimposed on one another and divided into grid cells G of a grid form (a region divided into a grid including a plurality of pieces of point data p), and representative point Pr is calculated for each grid cell G (see FIG. 6A). Then, a plane is generated based on representative point Pr, and output as three-dimensional map M of the work area (see FIG. 6B).

To be more specific, three-dimensional map creation step STEP-2 is composed of grid cell generation process STEP-21 and three-dimensional map update process STEP-22.

At grid cell generation process STEP-21, corrected point group data P is superimposed on one another and divided into grid cells G of a grid form. Then, the average value of the altitude value of point data p included in grid cell G (the height component of the coordinate value) is calculated, and representative point Pr with the average height component value is calculated at the gravity center of grid cell G.

At three-dimensional map update process STEP-22, representative point Pr calculated anew for each grid cell G is acquired. In addition, existing representative point Pr calculated at the last time is also acquired. Then, when representative point Pr calculated anew and existing representative point Pr are different from each other, a plane based on representative point Pr calculated anew is generated and three-dimensional map M is output.

Figure 7A:
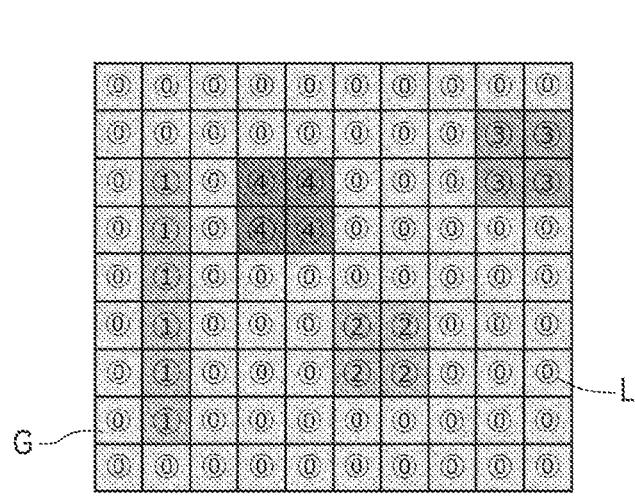
FIG. 7 is a diagram illustrating an overview of a clustering step.
Figure 7B:
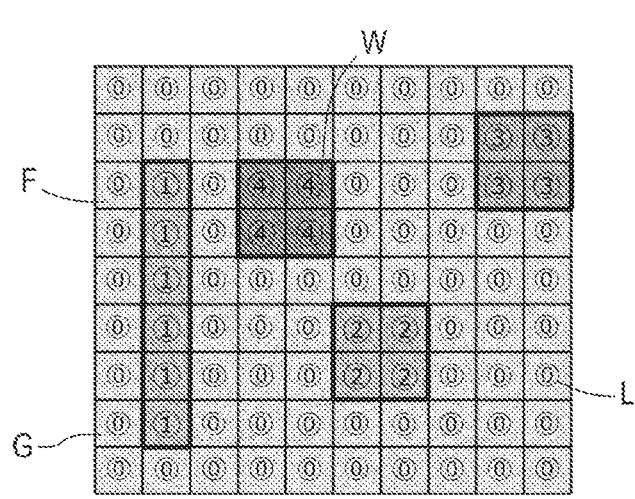
Figure 7C:
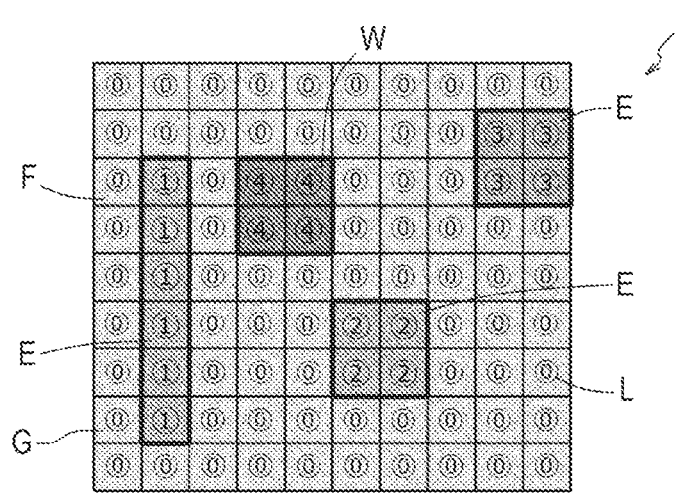

At clustering step STEP-3, label L is provided to the identification region on the basis of the relationship of the height components of representative points Pr regarding representative points Pr of adjacent grid cells G on the upper, lower, left and right sides (see FIG. 7A). Note that the circled numbers illustrated in FIG. 7A and the like represent labels L. Then, among the identification regions provided with the same label L, the identification region corresponding to lifting cargo W is output as lifting cargo W, and the identification region corresponding to ground surface F is output as ground surface F (see FIG. 7B). Further, the other identification regions are output as ground object E (see FIG. 7C).

To be more specific, clustering step STEP-3 is composed of labeling process STEP-31, same region estimation process STEP-32 and ground object region estimation process STEP-33.

At labeling process STEP-31, grid cells G arranged in a grid are assumed to be pixels. In addition, the height component of representative point Pr in each grid cell G is assumed to be the luminance value. Further, the luminance values of adjacent grid cells G on the upper, lower, left and right sides are compared with each other based on a predetermined rule, and label is provided to the identification region.

At same region estimation process STEP-32, the identification regions provided with the same label L are assumed to be one flat surface. Further, the identification region manually selected by the operator from among the identification regions provided with the same label L is output as lifting cargo W. In addition, the identification region with a largest number of pieces of point data p is output as ground surface F.

At ground object region estimation process STEP-33, a set of representative points Pr is acquired as an identification region for regions other than the identification regions set as lifting cargo W and ground surface F. Then, after ground surface F set as the identification region closest to that identification region is acquired, the average value of the height components is calculated, and it is output as ground object E when the average value difference is equal to or smaller than the height component difference of the same identification region.

Figure 8A:
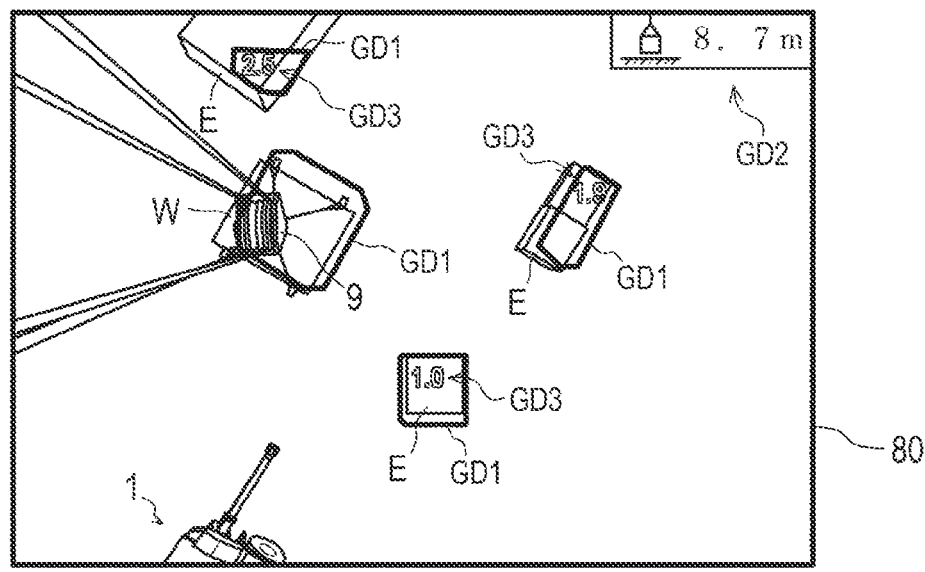
FIG. 8 is a diagram illustrating an overview of a work area visualization step.
Figure 8B:
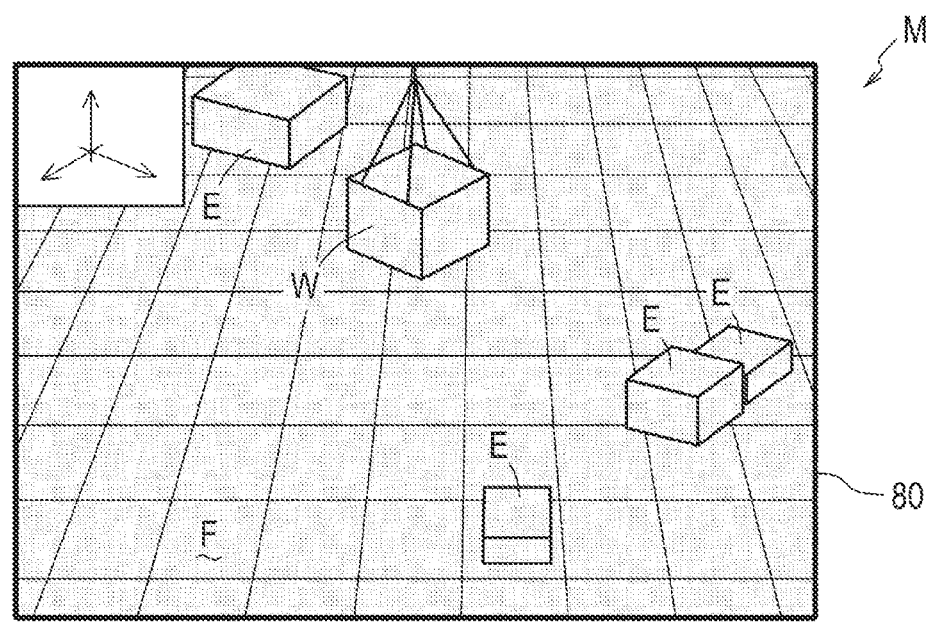

At work area visualization step STEP-4, guide information such as guide frame diagram GD1 that surrounds lifting cargo W and ground object E (including numerical values GD2 and GD3 representing the altitude) is generated, the guide information is superimposed on the image captured with camera 61, and output to data display section 80 (see FIG. 8A). In addition, three-dimensional map M representing the three-dimensional positional relationship of lifting cargo W, ground surface F and ground object E is visualized and output (see FIG. 8B).

To be more specific, work area visualization step STEP-4 is composed of region visualization process STEP-41 and three-dimensional map visualization process STEP-42.

At region visualization process STEP-41, the positions of lifting cargo W and ground object E on the image are calculated on the basis of the position and orientation of laser scanner 62. Then, guide frame diagram GD1 that surrounds lifting cargo W and ground object E is generated, and guide frame diagram GD1 is output in a superimposed manner on lifting cargo W and ground object E in the image captured with camera 61. In addition, numerical value GD2 representing the altitude of lifting cargo W and numerical value GD3 representing the altitude of ground object E are also output.

At three-dimensional map visualization process STEP-42, for lifting cargo W, ground surface F and ground object E provided with label L, the coordinate value of representative point Pr is acquired for each grid cell G. Then, a plane with representative point Pr as the center of gravity is generated for each grid cell G. At this time, the width of one side of the plane is the same as the width of grid cell G. Thereafter, each of lifting cargo W, ground surface F and ground object E is colored so as to visualize it as three-dimensional map M.

Next, a procedure of ground object region estimation process STEP-33 according to the first embodiment is elaborated. Here, it is assumed that ground object E has already been specified.

As described above, data processing section 70 performs ground object region estimation process STEP-33 at clustering step STEP-3.

Figure 9:
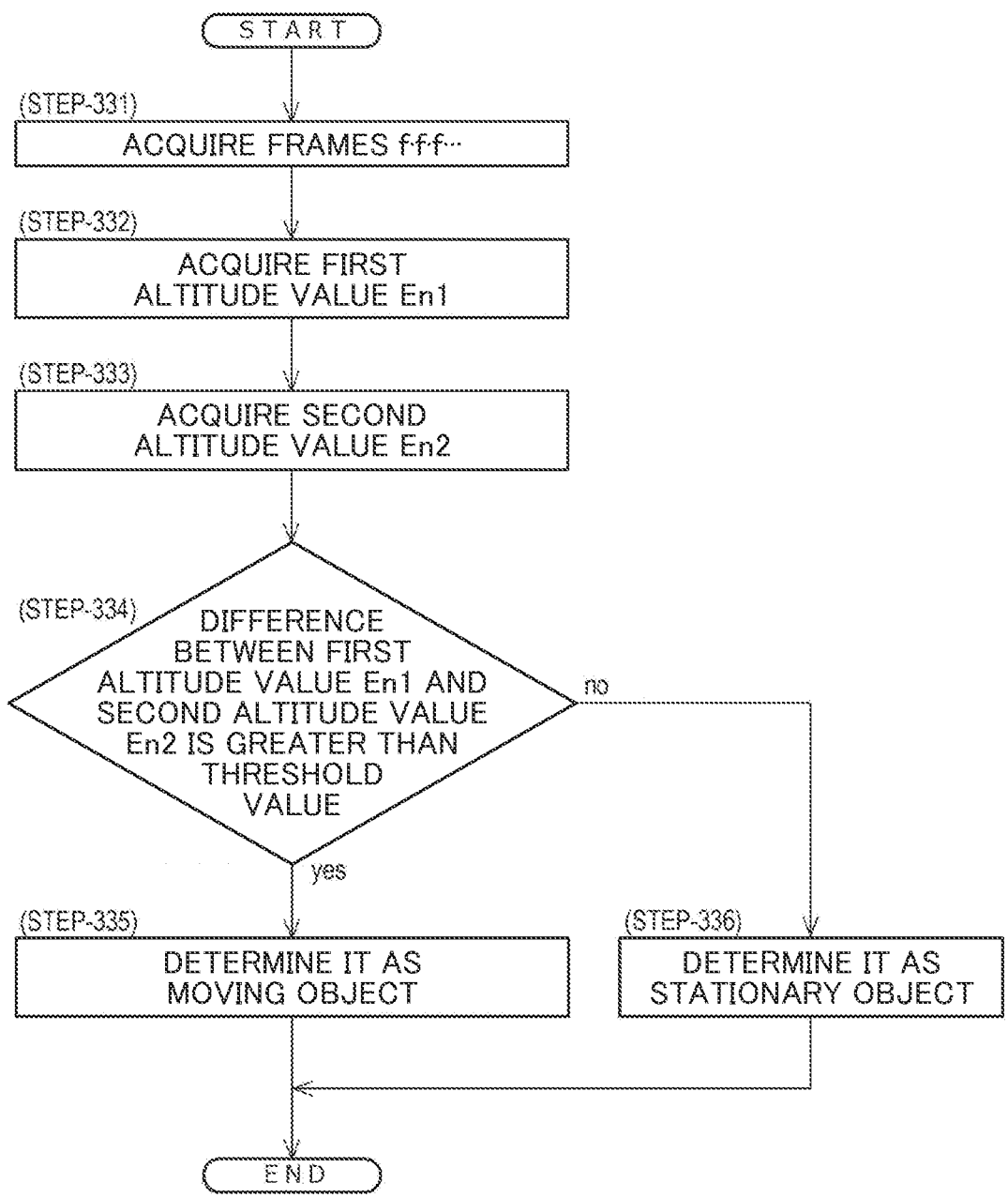
FIG. 9 is a flow chart illustrating a procedure of a same region estimation process according to a first embodiment.

As illustrated in FIG. 9, ground object region estimation process STEP-33 is composed of a plurality of processes performed for each grid cell G. The procedure of the process described below is an example that can be employed for guide display device 50. It should be noted that the procedure of the process is not limitative as long as the invention described in the subject application can be achieved.

Figure 10A:
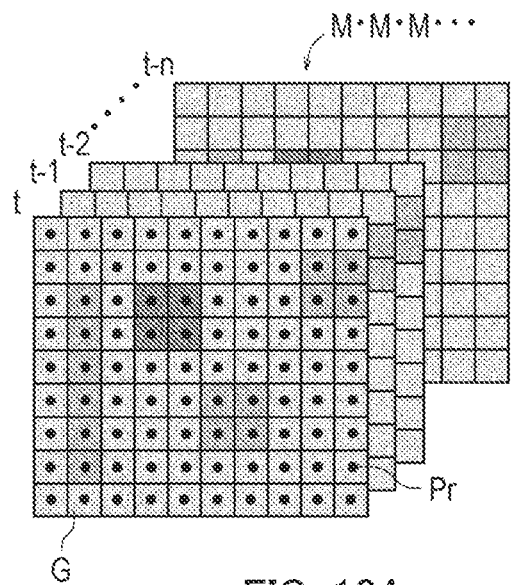
FIG. 10 is a diagram illustrating an overview of the same region estimation process according to the first embodiment.

At first process STEP-331, data processing section 70 acquires a plurality of frames f·f·f . . . aligned in a time-series manner (see FIG. 10A). The "frame f" can be said to be synonymous with a three-dimensional map M created based on point group data P at a certain time. After three-dimensional maps M·M·M . . . are acquired, the process proceeds to second process STEP-332.

Figures 10B, 10C:
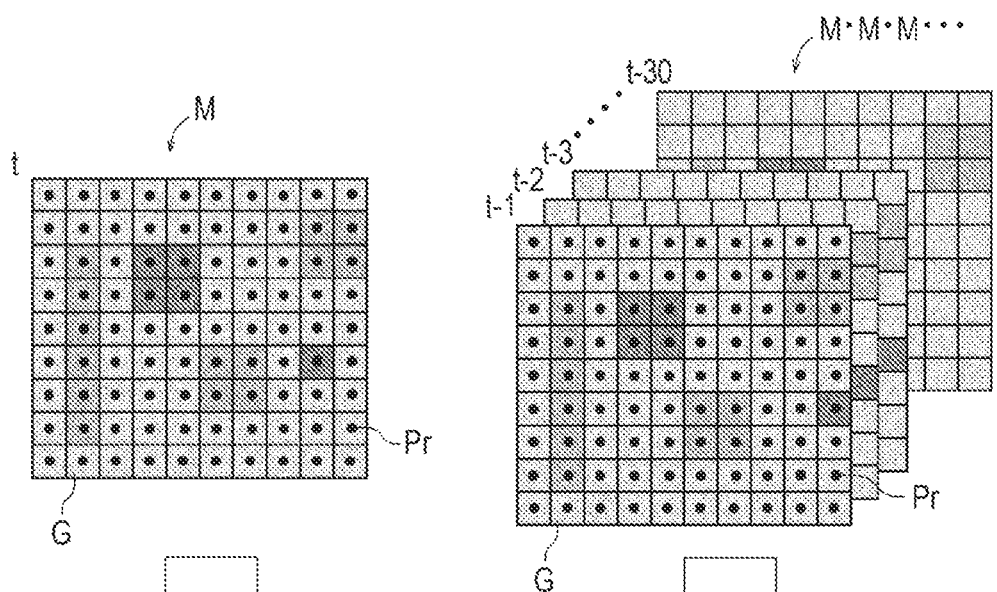

At second process STEP-332, data processing section 70 acquires the altitude value (the height component of representative point Pr) of each grid cell G as first altitude value En1 for three-dimensional map M created at time t closest to the current time (see FIG. 10B). After first altitude value En1 is acquired, the process proceeds to third process STEP-333.

At third process STEP-333, data processing section 70 acquires the altitude value (the height component of representative point Pr) of each grid cell G for a predetermined number of three-dimensional maps M·M·M . . . excluding three-dimensional map M created at time t closest to the current time, and calculates the average altitude value as second altitude value En2 (see FIG. 10C). In this guide display device 50, the maps of the "predetermined number" are the past successive thirty maps (t-first to t-30th maps). After second altitude value En2 is acquired, the process proceeds to fourth process STEP-334.

At fourth process STEP-334, data processing section 70 determines whether the difference between first altitude value En1 and second altitude value En2 is greater than a threshold value. In this guide display device 50, the "threshold value" is 0.6 meters. When the difference is greater than the threshold value, the process proceeds to fifth process STEP-335, whereas when the difference is not greater than the threshold value, the process proceeds to sixth process STEP-336.

Figure 17:
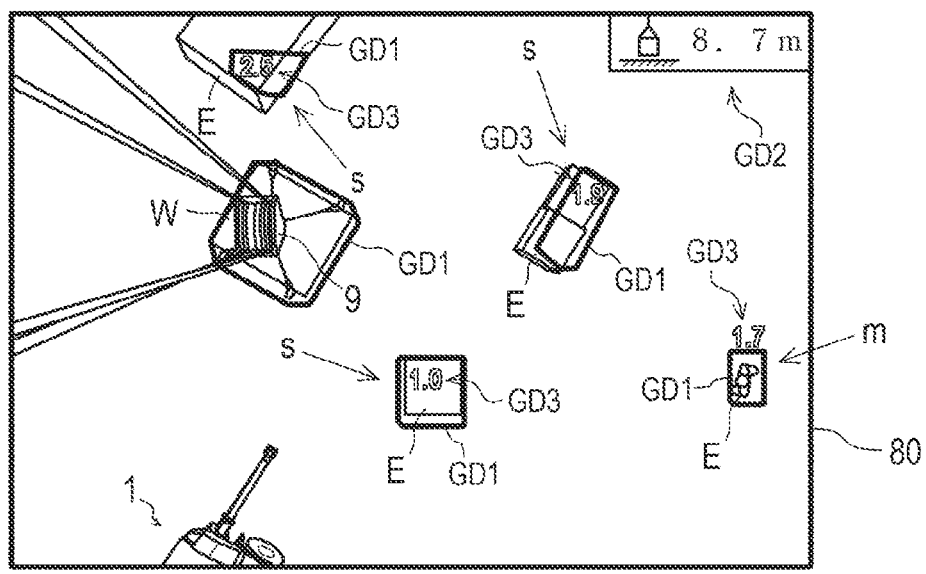
FIG. 17 is a diagram illustrating guide information generated through the same region estimation process.
Figure 18:
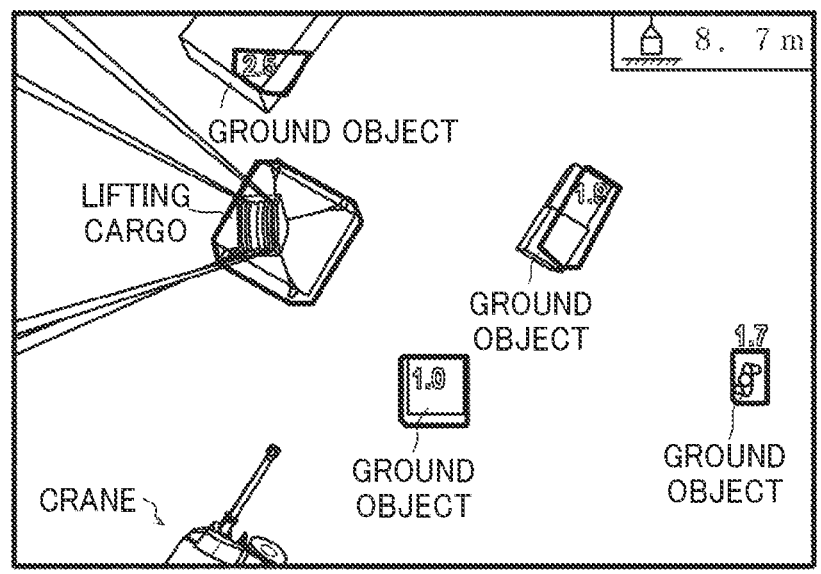
FIG. 18 is a diagram illustrating a situation where whether a ground object is a moving object cannot be recognized in a discriminative manner.

At fifth process STEP-335, data processing section 70 determines that ground object E including the grid cell G concerned is a moving object (see arrow m of FIG. 17). In this manner, data processing section 70 can recognize that this ground object E is a moving object. Note that for ground object E identified as a moving object, data display section 80 indicates guide frame diagram GD1 with a color different from that of other ground objects (ground objects identified as stationary objects) E. In addition, it indicates numerical value GD3 representing the altitude of the color different from that of the other ground objects (ground objects identified as stationary objects) E.

On the other hand, at sixth process STEP-336, data processing section 70 determines that ground object E including the grid cell G concerned is a stationary object (see arrow s of FIG. 17). In this manner, data processing section 70 can recognize that this ground object E is a stationary object. Note that for ground object E identified as a stationary object, data display section 80 indicates guide frame diagram GD1 with a color different from that of other ground objects (ground objects identified as moving objects) E. In addition, it indicates numerical value GD3 representing the altitude with a color different from that of other ground objects (ground objects identified as moving objects) E.

As described above, this guide display device 50 creates three-dimensional map M in a unit of successive frames f·f·f . . . . Then, it acquires the altitude value (the height component of representative point Pr) of each grid cell G as first altitude value En1 for three-dimensional map M created at time t closest to the current time, acquires the altitude value (the height component of representative point Pr) of each grid cell G for a predetermined number of three-dimensional maps M·M·M . . . excluding three-dimensional map M created at time t closest to the current time, calculates the average altitude value as second altitude value En2, and determines that it is a moving object when the difference between first altitude value En1 and second altitude value En2 exceeds a predetermined threshold value. With this guide display device 50, whether ground object E in the work area is a moving object can be recognized in a discriminative manner.

Incidentally, in this guide display device 50, it is possible to add a configuration that acquires the position of ground object E created at time t closest to the current time in three-dimensional map M, acquires the position of ground object E in other three-dimensional maps M excluding three-dimensional map M created at time t closest to the current time (the position of ground object E is acquired by using the last three-dimensional map M, but when the same ground object E is not indicated in that three-dimensional map M, the position of ground object E is acquired by using an older three-dimensional map M), and determines that it is a stationary object when these positions overlap each other. When such a configuration is added, it is possible to determine that the corresponding ground object E is a stationary object. Then, by excluding the ground object E determined to be a stationary object, the determination regarding a moving object can be more reliably performed for other ground objects E.

Next, a procedure of ground object region estimation process STEP-33 according to the second embodiment is elaborated. Here, it is assumed that ground object E has already been specified.

As described above, data processing section 70 performs ground object region estimation process STEP-33 at clustering step STEP-3.

Figure 11:
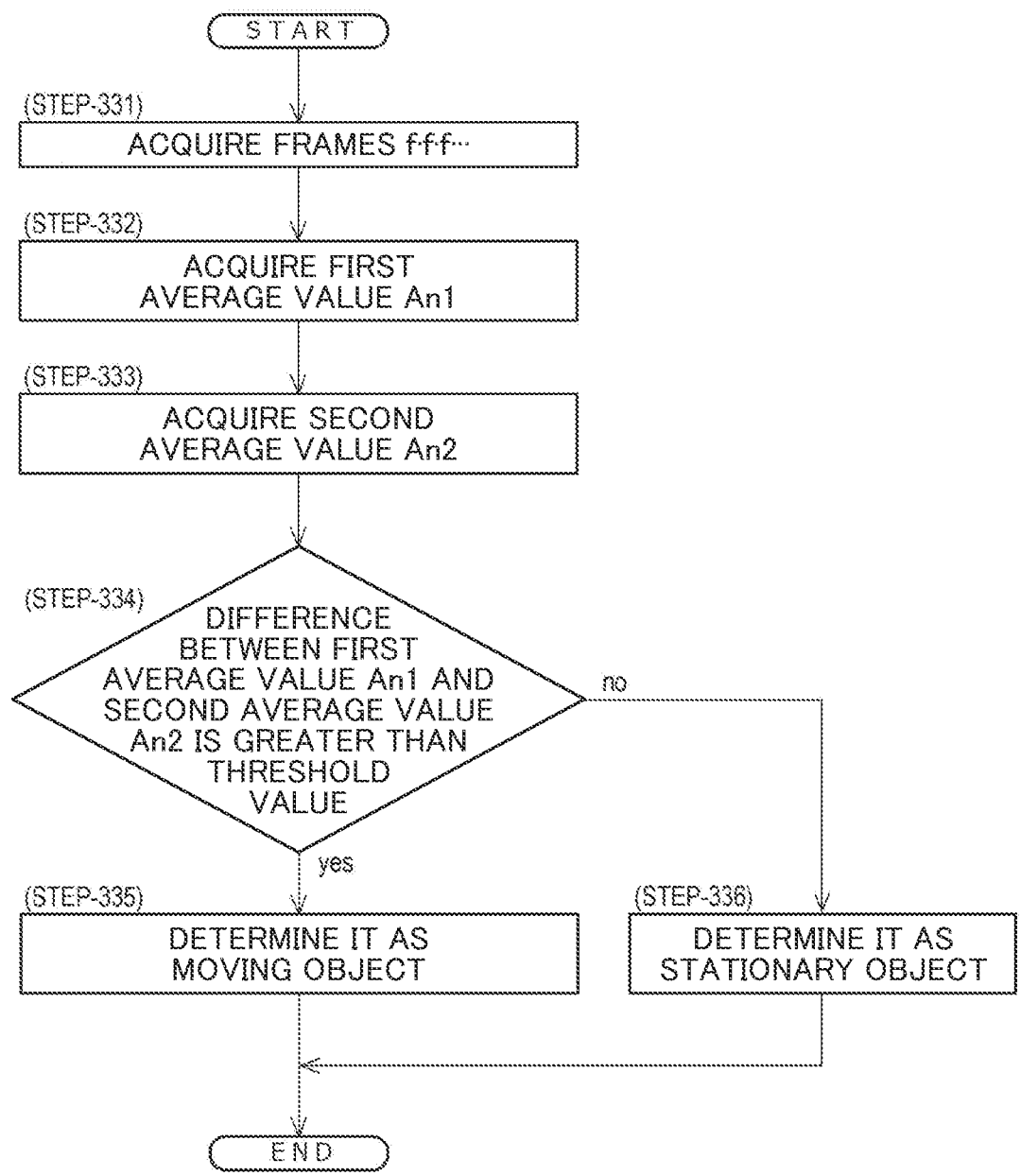
FIG. 11 is a flow chart illustrating a procedure of a same region estimation process according to a second embodiment.

As illustrated in FIG. 11, ground object region estimation process STEP-33 is composed of a plurality of processes performed for each grid cell G. The procedure of the process described below is an example that can be employed for guide display device 50. It should be noted that the procedure of the process is not limitative as long as the invention described in the subject application can be achieved.

Figure 12A:
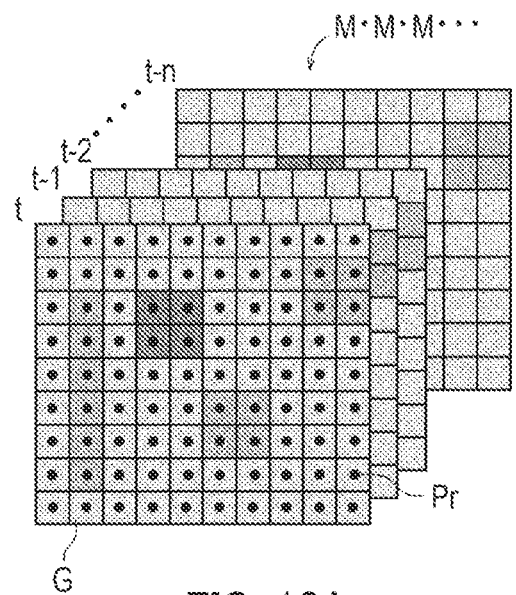
FIG. 12 is a diagram illustrating an overview of the same region estimation process according to the second embodiment.

At first process STEP-331, data processing section 70 acquires a plurality of frames f·f·f . . . aligned in a time-series manner (see FIG. 12A). The "frame f" can be said to be synonymous with a three-dimensional map M created based on point group data P at a certain time. After three-dimensional maps M·M·M . . . are acquired, the process proceeds to second process STEP-332.

Figure 12B:
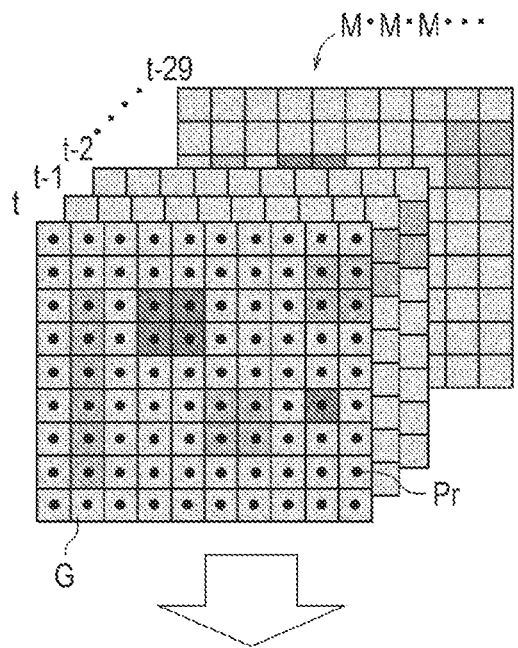

At second process STEP-332, data processing section 70 acquires the altitude value (the height component of representative point Pr) of each grid cell G for a predetermined number of three-dimensional maps M·M·M . . . including three-dimensional map M created at time t closest to the current time, and calculates the average altitude value as first average value An1 (see FIG. 12B). In this guide display device 50, the maps of the "predetermined number" are the past successive thirty maps (tth to t-29th maps). After first average value An1 is acquired, the process proceeds to third process STEP-333.

Figure 12C:
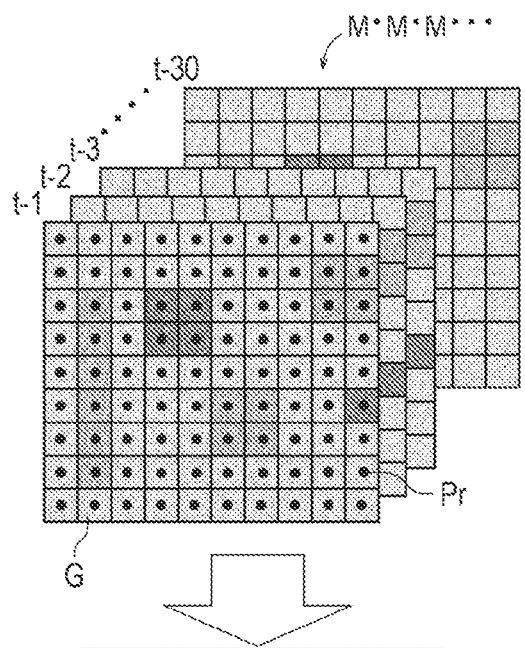

At third process STEP-333, data processing section 70 acquires the altitude value (the height component of representative point Pr) of each grid cell G for a predetermined number of three-dimensional maps M·M·M . . . excluding three-dimensional map M created at time t closest to the current time and calculates the average altitude value as second average value An2 (see FIG. 12C). In this guide display device 50, the maps of the "predetermined number" are the past successive thirty maps (t-first to t-30th maps). After second average value An2 is acquired, the process proceeds to fourth process STEP-334.

At fourth process STEP-334, data processing section 70 determines whether the difference between first average value An1 and second average value An2 is greater than a threshold value. In this guide display device 50, the "threshold value" is 0.4 meters. When the difference is greater than the threshold value, the process proceeds to fifth process STEP-335, whereas when the difference is not greater than the threshold value, the process proceeds to sixth process STEP-336.

At fifth process STEP-335, data processing section 70 determines that ground object E including the grid cell G concerned is a moving object (see arrow m of FIG. 17). In this manner, data processing section 70 can recognize that this ground object E is a moving object. Note that for ground object E identified as a moving object, data display section 80 indicates guide frame diagram GD1 with a color different from that of other ground objects (ground objects identified as stationary objects) E. In addition, it indicates numerical value GD3 representing the altitude of the color different from that of the other ground objects (ground objects identified as stationary objects) E.

On the other hand, at sixth process STEP-336, data processing section 70 determines that ground object E including the grid cell G concerned is a stationary object (see arrow s of FIG. 17). In this manner, data processing section 70 can recognize that this ground object E is a stationary object. Note that for ground object E identified as a stationary object, data display section 80 indicates guide frame diagram GD1 with a color different from that of other ground objects (ground objects identified as moving objects) E. In addition, it indicates numerical value GD3 representing the altitude with a color different from that of other ground objects (ground objects identified as moving objects) E.

As described above, this guide display device 50 creates three-dimensional map M in a unit of successive frames f·f·f . . . . Then, it acquires the altitude value (the height component of representative point Pr) of each grid cell G fir a predetermined number of three-dimensional maps M·M·M . . . including three-dimensional map M created at time t closest to the current time, calculates the average altitude value as first average value An1, acquires the altitude value (the height component of representative point Pr) of each grid cell G for a predetermined number of three-dimensional maps M·M·M . . . excluding three-dimensional map M created at time t closest to the current time, calculates the average altitude value as second average value An2, and determines that it is a moving object when the difference between first average value An1 and second average value An2 exceeds a predetermined threshold value. With this guide display device 50, whether around object E in the work area is a moving object can be recognized in a discriminative manner.

Incidentally, in this guide display device 50, it is possible to add a configuration that acquires the position of ground object E created at time t closest to the current time in three-dimensional map M, acquires the position of ground object E in other three-dimensional maps M excluding three-dimensional map M created at time t closest to the current time (the position of ground object E is acquired by using the last three-dimensional map M, but when the same ground object E is not indicated in that three-dimensional map M, the position of ground object E is acquired by using an older three-dimensional map M), and determines that it is a stationary object when these positions overlap each other. When such a configuration is added, it is possible to determine that the corresponding ground object E is a stationary object. Then, by excluding the ground object E determined to be a stationary object, the determination regarding a moving object can be more reliably performed for other ground objects E.

Next, a procedure of ground object region estimation process STEP-33 according to the third embodiment is elaborated. Here, it is assumed that ground object E has already been specified.

As described above, data processing section 70 performs ground object region estimation process STEP-33 at clustering step STEP-3.

Figure 13:
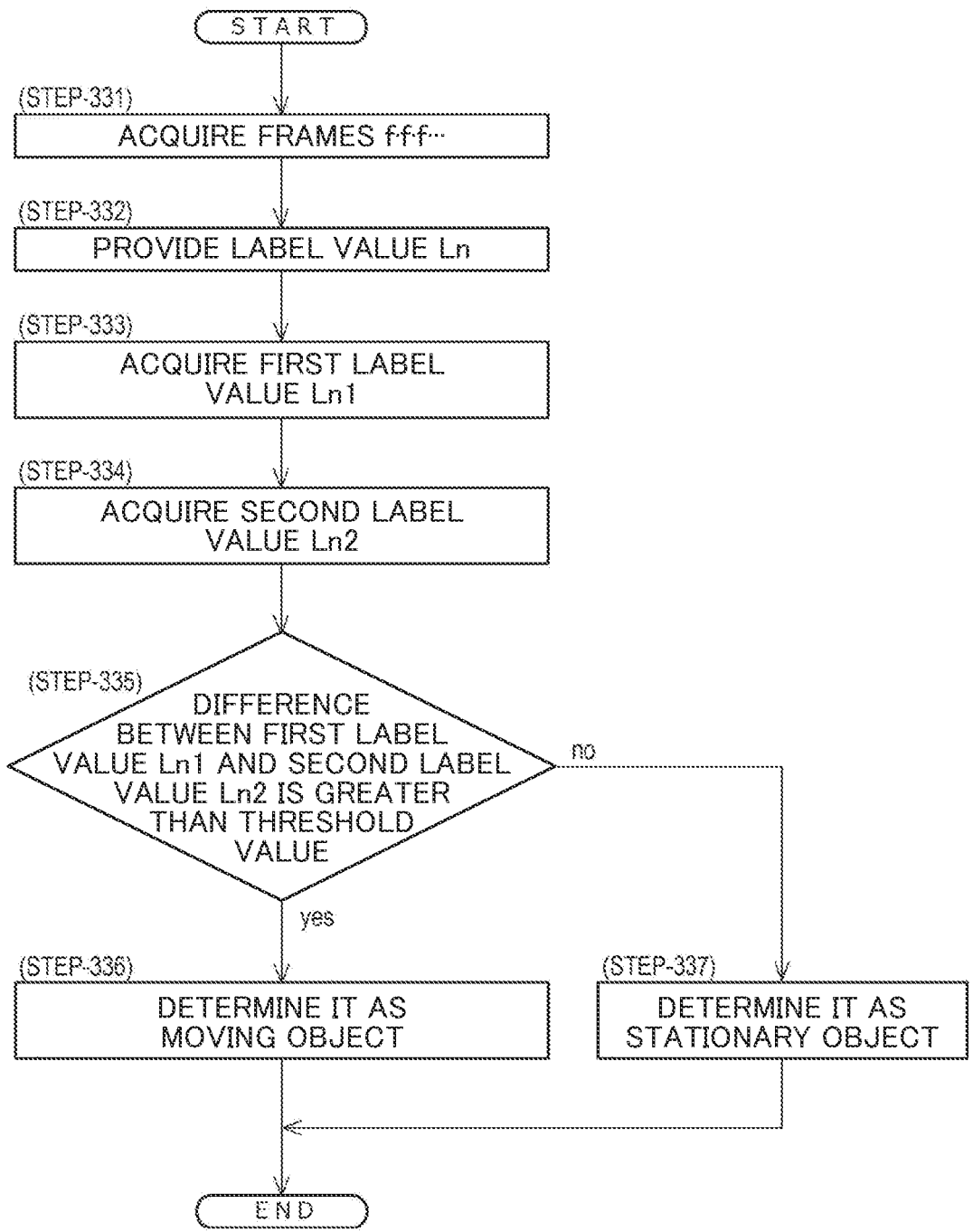
FIG. 13 is a flow chart illustrating a procedure of a same region estimation process according to a third embodiment.

As illustrated in FIG. 13, ground object region estimation process STEP-33 is composed of a plurality of processes performed for each grid cell G. The procedure of the process described below is an example that can be employed for guide display device 50. It should be noted that the procedure of the process is not limitative as long as the invention described in the subject application can be achieved.

Figure 14A:
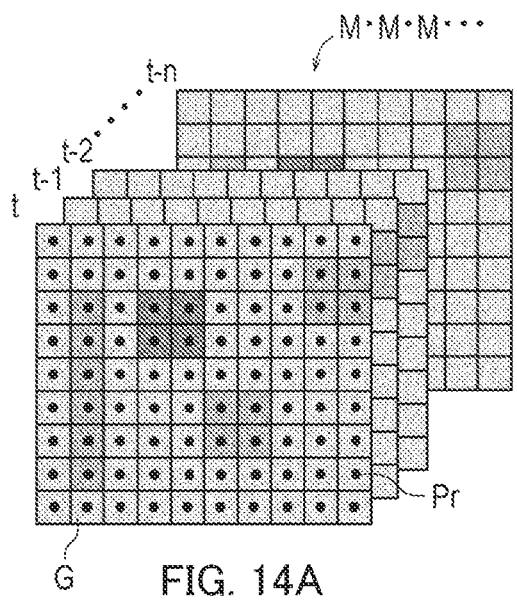
FIG. 14 is a diagram illustrating an overview of the same region estimation process according to the third embodiment.

At first process STEP-331, data processing section 70 acquires a plurality of frames f·f·f . . . aligned in a time-series manner (see FIG. 14A). The "frame f" can be said to be synonymous with a three-dimensional map M created based on point group data P at a certain time. After three-dimensional maps M·M·M . . . are acquired, the process proceeds to second process STEP-332.

Figure 14B:
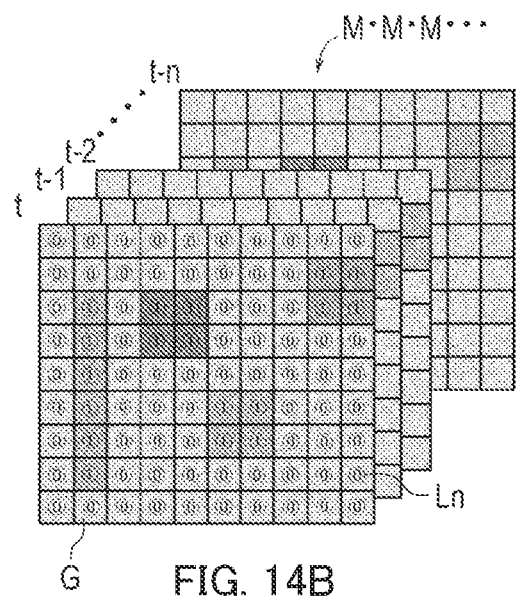

At second process STEP-332, data processing section 70 provides label value Ln representing ground surface F or ground object E to each of three-dimensional maps M·M·M . . . for each grid cell G (see FIG. 14B). "0" is provided as label value Ln to ground surface F, and "1" is provided as label value Ln to ground object E. After label value Ln is provided, the process proceeds to third process STEP-333.

Figure 14C:
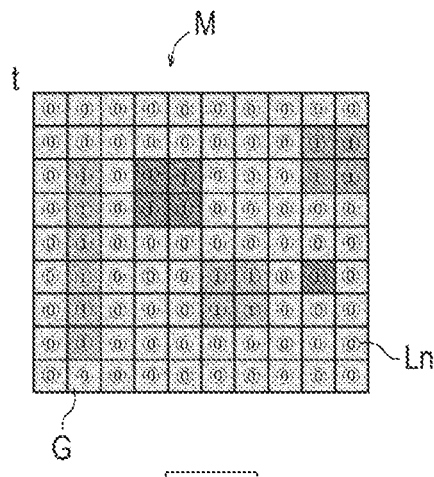

At third process STEP-333, for three-dimensional map M created at time t closest to the current time, data processing section 70 acquires label value (ground surface F is "0" and ground object E is "1") Ln of each grid cell G as first label value Ln1 (see FIG. 14C). After first label value Ln1 is acquired, the process proceeds to fourth process STEP-334.

Figure 14D:
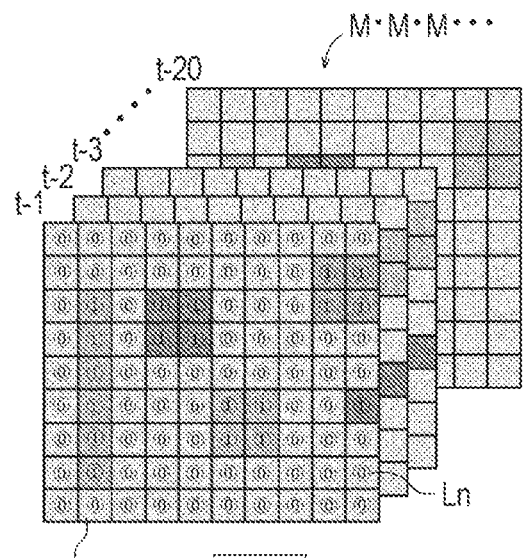

At fourth process STEP-334, for a predetermined number of three-dimensional maps M·M·M . . . excluding three-dimensional map M created at time t closest to the current time, data processing section 70 acquires label value (ground surface F is "0" and ground object E is "1") Ln of each grid cell G, and calculates the average of label value Ln as second label value Ln2 (see FIG. 14D). In this guide display device 50, the maps of the "predetermined number" are the past successive twenty maps (t-first to t-20th maps). After second label value Ln2 is acquired, the process proceeds to fifth process STEP-335.

At fifth process STEP-335, data processing section 70 determines whether the difference between first label value Ln1 and second label value Ln2 is greater than a threshold value. In this guide display device 50, the "threshold value" is 0.85 meters. When the difference is greater than the threshold value, the process proceeds to sixth process STEP-336, whereas when the difference is not greater than the threshold value, the process proceeds to seventh process STEP-337.

At sixth process STEP-336, data processing section 70 determines that ground object E including the grid cell G concerned is a moving object (see arrow m of FIG. 17). In this manner, data processing section 70 can recognize that this ground object E is a moving object. Note that for ground object E identified as a moving object, data display section 80 indicates guide frame diagram GD1 with a color different from that of other ground objects (ground objects identified as stationary objects) E. In addition, it indicates numerical value GD3 representing the altitude of the color different from that of the other ground objects (ground objects identified as stationary objects) E.

On the other hand, at seventh process STEP-337, data processing section 70 determines that ground object E including the grid cell G concerned is a stationary object (see arrow s of FIG. 17). In this manner, data processing section 70 can recognize that this ground object E is a stationary object. Note that for ground object E identified as a stationary object, data display section 80 indicates guide frame diagram GD1 with a color different from that of other ground objects (ground objects identified as moving objects) E. In addition, it indicates numerical value GD3 representing the altitude with a color different from that of other ground objects (ground objects identified as moving objects) E.

As described above, this guide display device 50 creates three-dimensional map M in a unit of successive frames f·f·f . . . . Then, it provides label value Ln representing ground surface F or ground object E to each of three-dimensional maps M·M·M . . . for each grid cell G, acquires label value Ln of each grid cell G as first label value Ln1 for three-dimensional map M created at time t closest to the current time, acquires label value Ln of each grid cell G for a predetermined number of three-dimensional maps M·M·M . . . excluding three-dimensional map M created at time t closest to the current time, calculates the average of label values Ln·Ln·Ln . . . as second label value Ln2, and determines that it is a moving object when the difference between first label value Ln1 and second label value Ln2 exceeds a predetermined threshold value. With this guide display device 50, whether ground object E in the work area is a moving object can be recognized in a discriminative manner.

Incidentally, in this guide display device 50, it is possible to add a configuration that acquires the position of ground object E created at time t closest to the current time in three-dimensional map M, acquires the position of ground object E in other three-dimensional maps M excluding three-dimensional map M created at time t closest to the current time (the position of ground object E is acquired by using the last three-dimensional map M, but when the same ground object E is not indicated in that three-dimensional map M, the position of ground object E is acquired by using an older three-dimensional map M), and determines that it is a stationary object when these positions overlap each other. When such a configuration is added, it is possible to determine that the corresponding ground object E is a stationary object. Then, by excluding the ground object E determined to be a stationary object, the determination regarding a moving object can be more reliably performed for other ground objects E.

Next, a procedure of ground object region estimation process STEP-33 according to the fourth embodiment is elaborated. Here, it is assumed that ground object E has already been specified.

As described above, data processing section 70 performs ground object region estimation process STEP-33 at clustering step STEP-3.

Figure 15:
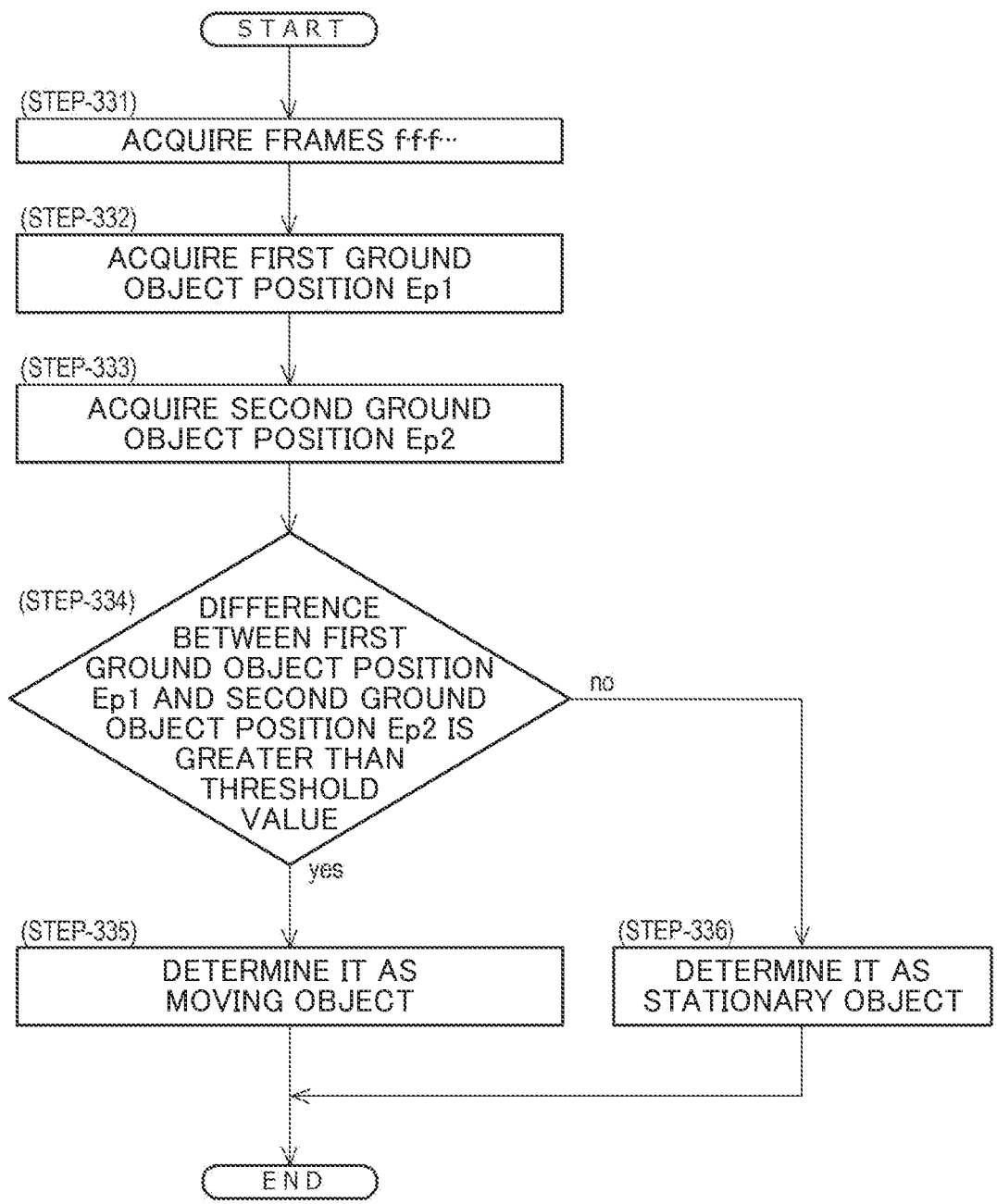
FIG. 15 is a flow chart illustrating a procedure of a same region estimation process according to a fourth embodiment.

As illustrated in FIG. 15, ground object region estimation process STEP-33 is composed of a plurality of processes performed for each grid cell G. The procedure of the process described below is an example that can be employed for guide display device 50. It should be noted that the procedure of the process is not limitative as long as the invention described in the subject application can be achieved.

At first process STEP-331, data processing section 70 acquires a plurality of frames f·f·f . . . aligned in a time-series manner (see FIG. 16A). The "frame f" can be said to be synonymous with a three-dimensional map M created based on point group data P at a certain time. After three-dimensional maps M·M·M . . . are acquired, the process proceeds to second process STEP-332.

At second process STEP-332, data processing section 70 acquires the position of ground object E created at time t closest to the current time in three-dimensional map M (coordinate value) as first ground object position Ep1 (see FIG. 16B). After first ground object position Ep1 is acquired, the process proceeds to third process STEP-333.

At third process STEP-333, data processing section 70 acquires the position (coordinate value) of ground object E in other three-dimensional maps M excluding three-dimensional map M created at time t closest to the current time, as second ground object position Ep2 (see FIG. 16C). In this guide display device 50, second ground object position Ep2 is acquired by using the last three-dimensional map M, but when corresponding ground object E is not indicated in that three-dimensional map M, second ground object position Ep2 is acquired by using another older three-dimensional map M. After second ground object position Ep2 is acquired, the process proceeds to fourth process STEP-334.

At fourth process STEP-334, data processing section 70 determines whether the difference (displacement in the horizontal direction) between first ground object position Ep1 and second ground object position Ep2 is greater than a threshold value. In this guide display device 50, the "threshold value" is defined by the coordinate value of grid cell G. When the difference is greater than the threshold value, the process proceeds to fifth process STEP-335, whereas when the difference is greater than the threshold value, the process proceeds to sixth process STEP-336.

At fifth process STEP-335, data processing section 70 determines that ground object E including the grid cell G concerned is a moving object (see arrow m of FIG. 17). In this manner, data processing section 70 can recognize that this ground object E is a moving object. Note that for ground object E identified as a moving object, data display section 80 indicates guide frame diagram GD1 with a color different from that of other ground objects (ground objects identified as stationary objects) E. In addition, it indicates numerical value GD3 representing the altitude of the color different from that of the other ground objects (ground objects identified as stationary objects) E.

On the other hand, at sixth process STEP-336, data processing section 70 determines that ground object E including the grid cell G concerned is a stationary object (see arrow s of FIG. 17). In this manner, data processing section 70 can recognize that this ground object E is a stationary object. Note that for ground object E identified as a stationary object, data display section 80 indicates guide frame diagram GD1 with a color different from that of other ground objects (ground objects identified as moving objects) E. In addition, it indicates numerical value GD3 representing the altitude with a color different from that of other ground objects (ground objects identified as moving objects) E.

As described above, this guide display device 50 creates three-dimensional map M in a unit of successive frames f·f·f . . . . Then, it specifies ground object E for each of three-dimensional maps M·M·M . . . , acquires the position of ground object E created at time t closest to the current time in three-dimensional map M as first ground object position Ep1, acquires, as second ground object position Ep2, the position of ground object E in another three-dimensional map excluding three-dimensional map M created at time t closest to the current time M, and determines that it is a moving object when the difference between first ground object position Ep1 and second ground object position Ep2 exceeds a predetermined threshold value. With this guide display device 50, whether ground object E in the work area is a moving object can be recognized in a discriminative manner.

Incidentally, in this guide display device 50, it is possible to add a configuration that acquires the position of ground object E created at time t closest to the current time in three-dimensional map M, acquires the position of ground object E in other three-dimensional maps M excluding three-dimensional map M created at time t closest to the current time (the position of ground object E is acquired by using the last three-dimensional nap M, but when the same ground object E is not indicated in that three-dimensional map M, the position of ground object E is acquired by using an older three-dimensional map M), and determines that it is a stationary object when these positions overlap each other. When such a configuration is added, it is possible to determine that the corresponding ground object E is a stationary object. Then, by excluding the ground object E determined to be a stationary object, the determination regarding a moving object can be more reliably performed for other ground objects E.

Finally, the subject of the invention may be considered to be crane 1 including guide display device 50, as well as guide display device 50.

Specifically, crane 1 includes guide display device 50. With such a crane 1, an effect similar to the above-described effect can be achieved.

INDUSTRIAL APPLICABILITY

The present invention is applicable to a guide display device and a crane including the same.

REFERENCE SIGNS LIST

1 Crane
50 Guide display device
60 Data acquiring section
61 Camera
62 Laser scanner
63 Inertia measurement unit (IMU)
64 First positioning apparatus (GNSS receiver)
65 Second positioning apparatus (GNSS receiver)
66 Sensor unit
70 Data processing section
80 Data display section
90 Data input section
F Frame
T Time
E Ground object
F Ground surface
G Grid
M Three-dimensional map
P Point group data
W Lifting cargo
Pr Representative point
En1 First altitude value
En2 Second altitude value
An1 First average value
An2 Second average value
Ln1 First label value
Ln2 Second label value
Ep1 First ground object position
Ep2 Second ground object position

The invention claimed is:

1. A guide display device of a crane, comprising:
a data processing section configured to calculate a representative point for each grid cell by using point group data acquired with a laser scanner by scanning a lifting cargo, a ground surface and a ground object from above the lifting cargo and create a three-dimensional map based on the representative point,
wherein the data processing section creates the three-dimensional map for each frame that is generated successively based on the point cloud data acquired at each time,
wherein the data processing section labels each grid cell of the three-dimensional map with either the lifting cargo, the ground surface, or the ground object based on a height of the representative point of each grid cell,
wherein the data processing section acquires an altitude value of each grid cell as a first altitude value for the three-dimensional map created at a time closest to a current time,
wherein the data processing section acquires an altitude value of each grid cell for a predetermined number of other three-dimensional maps excluding the three-dimensional map created at the time closest to the current time, and calculates an average of the altitude value as a second altitude value,
wherein the data processing section calculates a difference between the first altitude value and the second altitude value for each corresponding grid of the three-dimensional map, and determines that the ground object is a moving object when the difference exceeds a predetermined threshold value, and
wherein the data processing section associates the three-dimensional map with an image captured by a camera from above the lifting cargo and creates a guide frame diagram for the ground object identified on the three-dimensional map, and displays the guide frame diagram by superimposing it on the image, the guide frame diagram being set so that it is possible for an operator to distinguish whether the ground object is the moving object or not.

2. A crane comprising the guide display device according to claim 1.

3. A guide display device of a crane, comprising:
a data processing section configured to calculate a representative point for each grid cell by using point group data acquired with a laser scanner by scanning a lifting cargo, a ground surface and a ground object from above the lifting cargo and create a three-dimensional map based on the representative point,
wherein the data processing section creates the three-dimensional map for each frame that is generated successively based on the point cloud data acquired at each time,
wherein the data processing section labels each grid cell of the three-dimensional map with either the lifting cargo, the ground surface, or the ground object based on a height of the representative point of each grid cell,
wherein the data processing section acquires an altitude value of each grid cell for a predetermined number of the three-dimensional maps including the three-dimensional map created at a time closest to a current time, and calculates an average of the altitude value as a first average value,
wherein the data processing section acquires an altitude value of each grid cell for a predetermined number of other three-dimensional maps excluding the three-dimensional map created at the time closest to the current time, and calculates an average of the altitude value as a second average value,
wherein the data processing section calculates a difference between the first altitude value and the second altitude value for each corresponding grid of the three-dimensional map, and determines that the ground object is a moving object when the difference exceeds a predetermined threshold value, and
wherein the data processing section associates the three-dimensional map with an image captured by a camera from above the lifting cargo and creates a guide frame diagram for the ground object identified on the three-dimensional map, and displays the guide frame diagram by superimposing it on the image, the guide frame diagram being set so that it is possible for an operator to distinguish whether the ground object is the moving object or not.

4. A guide display device of a crane, comprising:
a data processing section configured to calculate a representative point for each grid cell by using point group data acquired with a laser scanner by scanning a lifting cargo, a ground surface and a ground object from above the lifting cargo and create a three-dimensional map based on the representative point, wherein the data processing section creates the three-dimensional map for each frame that is generated successively based on the point cloud data acquired at each time, wherein the data processing section provides a label value for each grid cell of the three-dimensional map with either the lifting cargo, the ground surface, or the ground object based on a height of the representative point of each grid cell, wherein the data processing section acquires the label value of each grid cell as a first label value for the three-dimensional map created at a time closest to a current time, wherein the data processing section acquires the label value of each grid cell for a predetermined number of other three-dimensional maps excluding the three-dimensional map created at the time closest to the current time, and calculates an average of the label value as a second label value, wherein the data processing section calculates a difference between the first altitude value and the second altitude value for each corresponding grid of the three-dimensional map, and determines that the ground object is a moving object when the difference exceeds a predetermined threshold value, and wherein the data processing section associates the three-dimensional map with an image captured by a camera from above the lifting cargo and creates a guide frame diagram for the ground object identified on the three-dimensional map, and displays the guide frame diagram by superimposing it on the image, the guide frame diagram being set so that it is possible for an operator to distinguish whether the ground object is the moving object or not.

5. A guide display device of a crane, comprising:

a data processing section configured to calculate a representative point for each grid cell by using point group data acquired with a laser scanner by scanning a lifting cargo, a ground surface and a ground object from above the lifting cargo and create a three-dimensional map based on the representative point, wherein the data processing section creates the three-dimensional map for each frame that is generated successively based on the point cloud data acquired at each time, wherein the data processing section labels each grid cell of the three-dimensional map with either the lifting cargo, the ground surface, or the ground object based on a height of the representative point of each grid cell, wherein the data processing section acquires, as a first ground object position, a position of the ground object in the three-dimensional map created at a time closest to a current time, wherein the data processing section acquires, as a second ground object position, the position of the ground object in another three-dimensional map excluding the three-dimensional map created at a time closest to a current time, wherein the data processing section calculates a difference between the first altitude value and the second altitude value for each corresponding grid of the three-dimensional map, and determines that the ground object is a moving object when the difference exceeds a predetermined threshold value, and wherein the data processing section associates the three-dimensional map with an image captured by a camera from above the lifting cargo and creates a guide frame diagram for the ground object identified on the three-dimensional map, and displays the guide frame diagram by superimposing it on the image, the guide frame diagram being set so that it is possible for an operator to distinguish whether the ground object is the moving object or not.

* * * * *